(12) United States Patent
O'Grady

(10) Patent No.: US 12,293,352 B2
(45) Date of Patent: May 6, 2025

(54) SYSTEM AND METHOD FOR INTEGRATION AND VALIDATION

(71) Applicant: Coinbase, Inc., San Francisco, CA (US)

(72) Inventor: Patrick O'Grady, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 449 days.

(21) Appl. No.: 17/215,679

(22) Filed: Mar. 29, 2021

(65) Prior Publication Data

US 2021/0304191 A1  Sep. 30, 2021

Related U.S. Application Data

(60) Provisional application No. 63/094,461, filed on Oct. 21, 2020, provisional application No. 63/067,547, filed on Aug. 19, 2020, provisional application No. 63/000,938, filed on Mar. 27, 2020, provisional application No. 63/000,947, filed on Mar. 27, 2020.

(51) Int. Cl.

| | |
|---|---|
| *G06Q 20/30* | (2012.01) |
| *G06F 9/38* | (2018.01) |
| *G06F 9/54* | (2006.01) |
| *G06Q 20/36* | (2012.01) |
| *G06Q 20/40* | (2012.01) |
| *H04L 9/06* | (2006.01) |
| *H04L 9/08* | (2006.01) |
| *H04L 9/00* | (2022.01) |

(52) U.S. Cl.
CPC .......... *G06Q 20/36* (2013.01); *G06F 9/3877* (2013.01); *G06F 9/541* (2013.01); *G06Q 20/401* (2013.01); *H04L 9/0643* (2013.01); *H04L 9/0819* (2013.01); *H04L 9/50* (2022.05)

(58) Field of Classification Search
CPC ..... G06Q 20/36; G06Q 20/401; G06F 9/3877
USPC .......................................................... 705/67
See application file for complete search history.

(56) References Cited

U.S. PATENT DOCUMENTS

| | | | |
|---|---|---|---|
| 2016/0234026 A1* | 8/2016 | Wilkins | G06F 21/64 |
| 2018/0308072 A1* | 10/2018 | Smith | G06Q 20/02 |
| 2021/0243011 A1* | 8/2021 | Amin | G06Q 20/385 |

OTHER PUBLICATIONS

International Search Report and Written Opinion for application No. PCT/US21/24624 dated Jun. 8, 2021.

* cited by examiner

*Primary Examiner* — John W Hayes
*Assistant Examiner* — Cristina Owen Sherr
(74) *Attorney, Agent, or Firm* — Foley & Lardner LLP

(57) ABSTRACT

Systems and methods for integration of components to facilitate executing transactions with different blockchain networks by using a standard API format. A standardized blockchain request identifying a blockchain network is received. The request is routed to a node synced with the blockchain network. A blockchain-specific call is constructed based on the standardized blockchain request. The blockchain network is interacted with using the blockchain-specific call. A response to the blockchain-specific call is returned in a standardized format.

20 Claims, 15 Drawing Sheets

SYSTEM AND METHOD FOR INTEGRATION AND VALIDATION

CROSS-REFERENCE TO RELATED APPLICATIONS

This application claims the benefit of U.S. Provisional Application No. 63/000,938 filed 27 Mar. 2020, U.S. Provisional Application No. 63/000,947 filed 27 Mar. 2020, U.S. Provisional Application No. 63/067,547 filed 19 Aug. 2020, and U.S. Provisional Application No. 63/094,461 filed 21 Oct. 2020, each which is incorporated in its entirety by this reference.

TECHNICAL FIELD

The subject technology described herein relates generally to the computing field, and more specifically to new and useful systems and methods in the computing field.

BACKGROUND

The proliferation of different blockchain protocols has made blockchain interactions increasingly more difficult, requiring developers and end users to maintain integrations with each supported blockchain. For example, if an end user (e.g., developer, exchange, etc.) wants to support interoperability with multiple blockchains (e.g., ERC20 tokens, Litecoin, Bitcoin, Bitcoin classic, and the like), the end user must develop and maintain integrations for each chain according to the respective blockchain's cryptocurrency protocol. This creates an undesirable barrier to new blockchain adoption and ongoing maintenance.

The subject technology provides improved/new and useful systems and methods for standardizing blockchain interactions across blockchains with different protocols.

DESCRIPTION OF THE PREFERRED EMBODIMENTS

Figure 1:
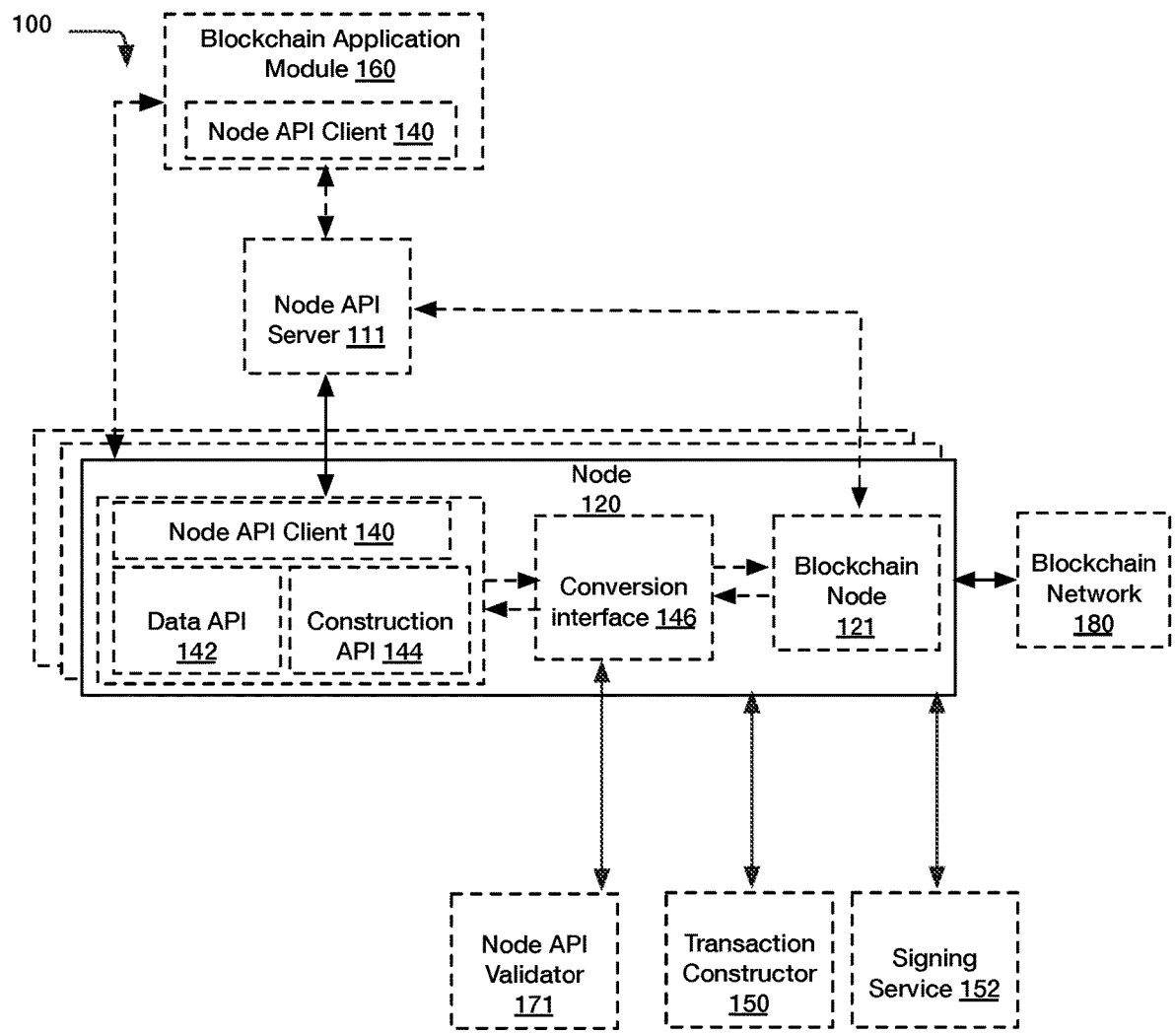
FIG. 1 is a schematic representation of a system, in accordance with various embodiments.

The following description of the preferred embodiments of the subject technology is not intended to limit the subject technology to these preferred embodiments, but rather to enable any person skilled in the art to make and use this subject technology.

1. Overview

The system and method function to provide improved integration of components in a computing system, and validation of such integrations.

Computing system components can include one or more of: receiving a standardized blockchain request identifying a blockchain network S210; routing the request to a node synced with the blockchain network S220; constructing a blockchain-specific call based on the standardized blockchain request S230; interacting with the blockchain network using the blockchain-specific call S240; and returning a response to the blockchain-specific call in a standardized format S250.

Embodiments of the subject technology described herein (e.g., systems and methods) function to resolve issues arising from interfacing with multiple different blockchain protocols.

Developing reliable integrations between blockchain applications (e.g., blockchain application module 160) and blockchain nodes (e.g., blockchain node 121) can be complicated and time consuming. The process can involve careful analysis of the unique aspects of each blockchain and extensive communication with its developers to understand the best strategies to deploy nodes, recognize deposits, broadcast transactions, and the like. Even a minor misunderstanding can lead to downtime (e.g., due to an inadvertent erroneous technical implementation), or even worse, incorrect fund attribution. Moreover, this integration must be continuously modified and tested each time a blockchain team releases new software to at least ensure functionality is preserved.

Instead of spending time working on their blockchain application, project developers spend countless hours answering similar support questions for each team integrating their blockchain node. With their questions answered, each integrating team then writes similar code to interface with the blockchain node instead of spending their engineering resources adding support for more blockchain projects or working on unique products and applications. In some instances, the third party may also need to maintain a blockchain node for each blockchain, each of which can require extensive engineering resources to deploy, validate, maintain, and keep up to date, along with potentially increasing capital expenditures (e.g., costs) to acquire additional blockchain nodes as additional blockchains are integrated.

The subject technology enables this interoperability by facilitating use of a single, standard API format that enables third parties to deterministically specify intent by allowing information to be read from multiple blockchains using a standard request format. The standard API format can enable information to be written to multiple blockchains using a standard request format. The subject technology can connect multiple third parties to the multiple blockchains via a single API server, multiple API server instances (e.g., one per blockchain, one per blockchain node), different API server, and/or any suitable number of API servers.

In an example, the subject system can include one or more API servers (e.g., node API server 111) that function to communicate with one or more API clients (e.g., node API client 140). API clients can be included in a blockchain protocol (e.g., in blockchain node 121), provided as a stand-alone module (e.g., node API client 140), integrated within the blockchain application module (e.g., used by the blockchain application module 160), and/or otherwise integrated with each supported blockchain.

In some variations, the subject system includes at least one validation system (e.g., node API validator 171) that functions to validate at a given API client's implementation of the standard API for compliance with the standard API specification and/or format.

In some implementations, the API servers include at least one blockchain node API server that enables a blockchain application (e.g., blockchain application module 160) to communicate with a corresponding blockchain node (e.g., blockchain node 121) by using a standard blockchain node API. In this manner, a blockchain application can interact with several blockchain nodes by using a standard interface. To ensure that an API server complies with the API specification, the subject system can include at least one API validator (e.g., node API validator 171) that functions to validate respective implementations of the API specification by one or more API servers, and optionally provide compliance or performance benchmarking (e.g., to internal or external systems). Compliant blockchain protocols and/or nodes can optionally be published to a public list, such that third parties can easily identify nodes for use (e.g., without having to run testnets or alternative blockchains utilized in testing, for every supported blockchain).

A method can include one or more of: deploying an API (e.g., a blockchain node, middleware, an API server) S310, validating the API S320; accessing information via the API server S330; generating monitoring information S340; and generating at least one transaction S350. At least one component of the system can perform at least a portion of the method.

2. Benefits

The system and method can confer several benefits over existing systems and methods.

First, by virtue of using a standard set of calls (e.g., API calls), a blockchain application can use a single interface (e.g., for calls, responses, reading, writing, and the like) for interacting with multiple blockchain networks (e.g., different blockchain protocols). Each blockchain can natively accept the standard API format, or include a middleware translation layer (e.g., provided by the blockchain issuer) that translates the standard API format to the native blockchain format, such as in an example shown in FIG. 6.

Second, by virtue of constructing transactions by using operation objects defined by an API used by the node API server, transactions can be generated without an understanding (or knowledge) of the native operations of a blockchain network thereby simplifying code and reducing maintenance of such code.

Third, a blockchain developer can more easily validate the blockchain protocol or middleware's compliance with a standardized API format (e.g., using a standardized validation tool), and determine potential issues before deployment in a live environment involving (real) transactions that executed on the blockchain network(s).

Fourth, by validating the blockchain protocol or middleware's API compliance, a blockchain application can implement error handling mechanisms that address errors in the API-compatible implementation and/or provide workarounds to continue operations with the API server.

Fifth, by generating monitoring information, monitoring information can be provided to external systems that subscribe to monitoring information for the API server. Such monitoring information can be used to update a parser to accommodate for implementation changes in an API server used for a particular blockchain network.

Sixth, by performing validation and/or monitoring, new blockchain network integrations can more easily be evaluated (and optionally certified) for inclusion in a cryptocurrency exchange. When the new blockchain integrations are included in the cryptocurrency exchange, new transactions utilizing such integrations are enabled.

Seventh, as described further herein, a construction API (e.g., for constructing and submitting transactions to a blockchain network) enable stateless operations which can perform construction operations offline (e.g., when metadata such as account information is pre-fetched), and also does not have access to private key material thereby increasing the security of the subject system. In variants, the construction API (e.g., standard API for writing to blockchains) can confer additional compatibility with various blockchain protocols by deterministically specifying a transaction "intent," (e.g., on-chain operation, such as withdrawal, flush, sweep, restore, maintenance, flex, stake, and the like) which can then be mapped to one or more blockchain-specific requests and managed in a blockchain-specific manner.

However, further advantages can be provided by the system and method disclosed herein.

3. System

FIG. 1 is a schematic representation of the system, in accordance with various embodiments. The system 100 can include one or more of: an API server (e.g., node API server in) and a node (e.g., node 120). The system can be accessed by one or more application modules (e.g., blockchain application module 160).

The optional server (e.g., node API server 111) functions to receive standard requests from one or more callers (e.g., blockchain application modules 160, node API client 140) and route the requests to the appropriate blockchain nodes 120. The server can optionally route responses and/or other blockchain data from the nodes 120 to the callers. The system can include a single server, include a server per geographic region, include multiple servers (e.g., multiple instances of the same server; different servers for different blockchains; etc.), and/or include any suitable number of servers. The server preferably does not convert the standard request to a blockchain-specific protocol; alternatively, the server can convert the standard request to the blockchain-specific protocol. The API server can provide data asynchronously, or synchronously (e.g., in response to a request). Requests (e.g., received from the third party application, received by the API server, received by the blockchain node, and the like) can identify one or more data objects for retrieval from and/or transmission to the blockchain. The server discussed herein can be a computing resource, such as a server, a virtual machine or virtual server, cloud computing service, container, or any other appropriate computing resource that executes and/or provides a suitable computing platform for components of the system 100, as described further below. The server can be accessed by one or more application modules 160 (e.g., caller, endpoints, applications, etc.), clients (e.g., node API client 140), blockchain nodes 120, and/or any other component.

The node 120 functions to interface between the node API server or blockchain application module 160 and a blockchain. The node 120 as discussed herein can be a computing resource, such as a server, a virtual machine or virtual server, cloud computing service, container, or any other appropriate computing resource that executes and/or provides a suitable computing platform for components of the system 100, as described further below, which is accessed by the API server and/or the application module, or any other appropriate external component (as discussed further herein).

The node 120 can include: a node API client 140 and a blockchain node 121, and can optionally include a conversion interface 146.

The system 100 can optionally include one or more API clients (e.g., node API client 140). The API client functions to interface between an external endpoint (e.g., the API server 111, blockchain application module 160, etc.) and the blockchain network. The API client is preferably capable of receiving standard API calls, and returning standard API responses. The API client is preferably specific to a blockchain protocol and/or blockchain network (e.g., each blockchain protocol and/or network has a different API implementation, specific to that protocol and/or network), but can alternatively be generic. The API client is preferably specific to the blockchain protocol of the blockchain node 121, but can alternatively be specific to the blockchain network, specific to the blockchain class (e.g., UTXO or account-based), or be generic. The API client can be separate from the blockchain protocol, or be supported by (e.g., integrated within, natively supported by) the blockchain protocol. The API client can be included in a blockchain node 120, blockchain application module (e.g., blockchain application module 160), or included as a stand-alone module (e.g., node API client 140), and/or be otherwise configured.

The API client (e.g., node API client 140, node API) can function to perform or facilitate one or more of: fetching data (e.g., blockchain block, or any other suitable data object supported by the API server) from a blockchain node 121; synching data (e.g., blockchain blocks) from a blockchain node 121; parsing data (e.g., blockchain blocks) with the blockchain node 121; reconciling balance changes derived from parsing blockchain blocks (synched via the API server) with balance changes computed by a blockchain node (e.g., blockchain node 121); asserting that data received via the API server is correct; validating correctness of the standard API implementation of the API client; viewing a balance computed by the blockchain node; generating monitoring information (e.g., performance benchmarking information, performance changes, implementation modifications, validation information, and the like); and/or other functionalities. In some implementations, the API client includes an asserter for validating one or more of a network status, a list of network options, and a block. However, the API server can include any suitable asserter.

The API client can include a data API 142, which functions to read information from a blockchain node 121, and a construction API 144, which functions to write information to the blockchain node 121 (e.g., and, in turn, the blockchain synched with the blockchain node 121). The node API client can additionally include, function as, or interface with a conversion interface 146. However, the node API client can additionally or alternatively include any other suitable component.

The data API 142 provides functionality to access blocks, transactions, and balances of any blockchain in a standard format. The construction API 144 provides functionality to write (e.g., construct transactions) to a given blockchain in the standard API format. The data API 142 and a construction API 144 are preferably specific to the blockchain protocol, but can alternatively be generic. The data API 142 and a construction API 144 can be integrated into the blockchain protocol (e.g., wherein the blockchain protocol can natively support the data API 142 and a construction API 144 calls), but can alternatively be non-natively supported by the blockchain protocol, wherein a separate node API and/or a conversion interface 145 converts the data API 142 and a construction API 144 calls to a blockchain-specific call.

A blockchain node 121 can interface with a node API server and implement the functionality of the corresponding blockchain protocol. The system can include one or more blockchain nodes 121 for each supported blockchain (e.g., blockchain protocol or blockchain network). Examples of supported blockchains include: UTXO-based chains, account-based chains, and/or other chains. Examples of specific blockchains that can be supported include: Bitcoin, Bitcoin Cash, Litecoin, Ethereum, Ethereum Classic, XRP, Stellar Lumens, Dogecoin, ERC-20 tokens (e.g., USDC, DAI, etc.), and/or other blockchains. The blockchain nodes are preferably synchronized with the respective blockchain networks (e.g., continuously, periodically, in response to a synchronization request, etc.), but can alternatively be asynchronized from the respective blockchain networks. The blockchain nodes 121 are preferably initialized, updated, synchronized, and/or otherwise managed using the respective blockchain protocol, but can be otherwise managed.

The blockchain node 121 can natively accept and utilize the standard API format without requiring use of a middleware translation layer (e.g., conversion interface 146). In this variant, the blockchain protocol of the blockchain node 121 can include or natively support the data API 142 and/or construction API 144. Alternatively, the blockchain node (e.g., when the blockchain node does not natively support the standard API format) can utilize a conversion interface 146 to enable standard API interactions (e.g., with data API 142, construction API 144, node API client 140, node API validator, transaction constructor 150, detached signing services 152, and the like). In an example, the conversion interface 146 receives calls or requests in accordance with the standard API format, and performs a conversion process (e.g., converting the calls or requests to a native blockchain format) to enable the blockchain node to process the aforementioned. Further, when the conversion interface 146 receives information in the native blockchain format, the conversion interface 146 performs a conversion process (e.g., converting information to the standard API format) to enable other standard-compliant modules to process the information.

The conversion interface 146 functions to convert standard API calls to blockchain-specific calls. The system can include a different conversion interface 146 for one or more supported blockchains (e.g., blockchains that do not natively support the standard API calls). The conversion interface 146 can be separate from the API client, or be part of the API client.

Alternatively or conjunctively, a blockchain node (e.g., blockchain node 121) can be communicatively coupled to an external node API server (e.g., node API server 111) that functions as a middleware translation layer that translates the standard format to the native blockchain format. Alternatively, the system 100 can include a blockchain node that supports functionality in compliance with the standard API format.

Figure 10:
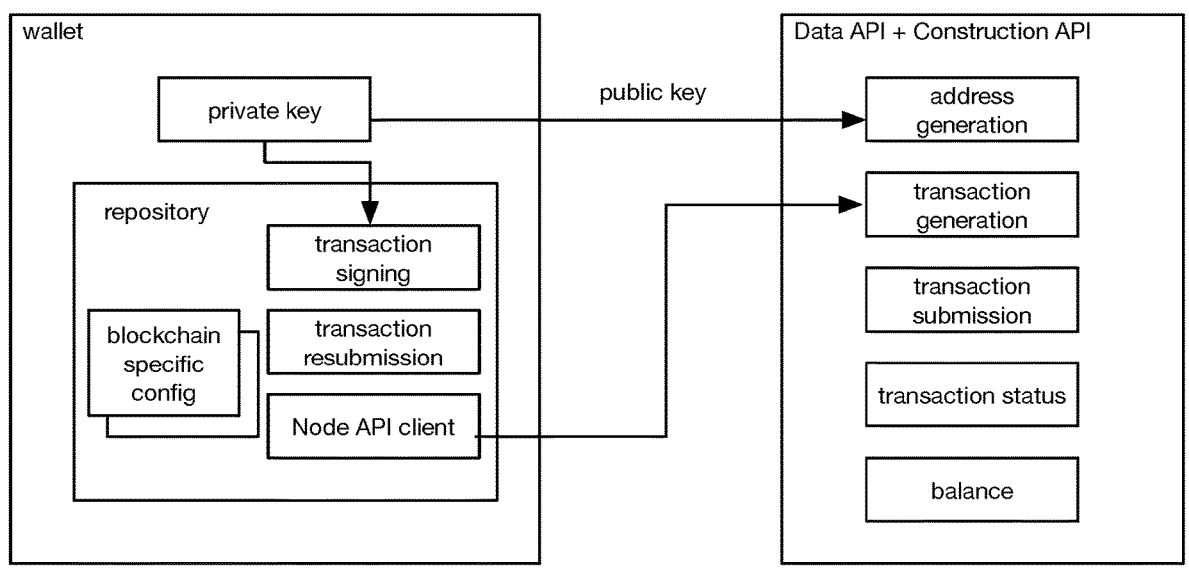
FIG. 10 is an illustrative example of a blockchain application module interacting with an example of the system.

Application modules 160 can include one or more of a digital wallet (example shown in FIG. 10), a blockchain explorer, a cryptocurrency exchange, application (e.g., data sharing application, rights tracking applications, security applications, voting applications, etc.), or any other suitable application that communicates with a blockchain node (e.g., blockchain node 121) (either directly, or indirectly via an API server). Each application module 160 can interface with one or more of the blockchains supported by the system using the standard API.

The application module 160 can optionally include a signing system, interact a detached signing system, use an on-chain signing system, and/or use any other signing system. The detached signing system is preferably separate from the application module 160, the node API server 111, and/or the node 120, but can alternatively be integrated therein. The detached signing system can be: a multi-signature system (e.g., that coordinates multi-signature signing between multiple users), a wallet (e.g., mobile wallet, hardware wallet, etc.), a third-party signing service (e.g., that custodies the private keys on behalf of the application), and/or other signing system. The detached signing system can be associated with the application module 160, associated with an end user of the application module 160, and/or otherwise custodied or controlled.

In some variations, a blockchain application module, a node API server, and a blockchain node (or module) are included in a same computing system (e.g., a cryptocurrency platform, such as an exchange, a hosted wallet, a payment system, and the like). Alternatively, the components of the system can be distributed across one or more computing systems. For example, a blockchain application module can be executed by a mobile device, and the blockchain application module can communicate with a node API server executed by a remote computing system.

In some variations, blockchain application modules can communicate with a blockchain node directly without using a node API server (e.g., node API server 111).

In some variations, one or more of the foregoing processes described for the API client can be performed by an API validator (e.g., node API validator 171). For example, a computing system operated by a developer of a blockchain node can include a separate API validator that functions to validate a node (or node API server) developed by the developer. The API validator can include a set of tests that blockchain (and/or conversion interface) developers can use to validate blockchain compliance with the standard API format (e.g., ensure that their blockchain protocol or conversion interface returns the correct responses). The API validator can be a library, a tool, an interface (e.g., command line interface (CLI)), and/or be otherwise implemented.

The system 100 can optionally include one or more transaction constructors (e.g., transaction constructor 150). Transaction constructors can include blockchain transaction constructors. A transaction constructor (e.g., transaction constructor 150) can function to receive as input one or more standardized data objects recognized by the API server, and construct a network-specific blockchain transaction. By using the transaction constructor to generate a network-specific blockchain transaction from a standardized blockchain transaction format that is standardized across different blockchain network protocols, a blockchain application can generate blockchain transactions using a standardized blockchain transaction format without having to use a network-specific transaction format for each blockchain network. Each transaction constructor can be specific to a blockchain protocol, generic (e.g., include transaction generation templates, flows, and/or operations for multiple blockchain protocols), specific to a blockchain type (e.g., one for UTXOs, one for account-based blockchains, etc.), and/or otherwise associated with different blockchains.

A transaction constructor can be included in a blockchain application module, be part of the construction API (e.g., part of the construction API implementation for the blockchain protocol), be a stand-alone module (e.g., transaction constructor 150), and/or be otherwise implemented. When the transaction constructor is a stand-alone module, the transaction constructor can receive transaction construction requests from one or more callers (e.g., nodes, node API clients, blockchain application modules 160, etc.) and return unsigned transactions. The transaction construction requests can specify: the transaction payload (e.g., message to be signed), the blockchain, the blockchain network, the signature parameters (e.g., signing curve, signing scheme, number of signatures needed), metadata (e.g., retrieved from the blockchain, provided by the blockchain application module 160, etc.), and/or other transaction information.

The system 100 can optionally interface with one or more signing services (e.g., signing service 152). The signing service can be: a signing library (e.g., provided by the blockchain application module 160), a detached signer (e.g., which can prevent system access to private keys), an on-chain signing service, and/or other signing service. The signing service can be owned (e.g., custodied, managed, executed, etc.) by: the system 100, the caller (e.g., the blockchain application module), another party, and/or another system. In some implementations, the blockchain node 121 receives an unsigned blockchain transaction, controls the signing service 152 to sign the unsigned blockchain transaction to generate a signed blockchain transaction, receives the signed blockchain transaction from the signing service 152, and broadcasts the signed blockchain transaction via the blockchain network 180. In some implementations, the blockchain node 121 receives blockchain information, and uses the received blockchain information to determine whether the signed transaction has been finalized in accordance with the protocol of the blockchain network 180. In some variations, the signing service 152 functions to perform at least one of: control of keypair generation, storage of keys, and control of transaction signing with stored keys.

The signing service 152 can be specific to a specific permutation of signing parameters (e.g., identified the request sent to the signing service 152, identified based on the blockchain network specified in the request, etc.), or be generic to different signing parameter combinations (e.g., wherein the signing service 152 uses the signing methods specified by the signing parameters). Examples of signing parameters that can be specified (e.g., in the signing request, by the blockchain application module 160, by the node API client 140, by the blockchain protocol, etc.) can include: the curve type, the signature type, a blockchain address (e.g., sender address), and/or other parameters. Examples of curve types that can be used include: secp256k1, secp256r1, edwards25519, tweedle, and/or other signing curves. Examples of signature types that can be used include: ecdsa, ecdsa_recovery, ed25519, schnorr_1, schnorr_poseidon, threshold signing, and/or other signature types. The signing service 152 can: generate the payload signature (e.g., using one or more keys that conform to the signing parameter combination); facilitate payload signing (e.g., identify the signatories associated with an address identified in the request, distribute the payload or components thereof to the signatories for signing, and aggregate the signatures thereafter); and/or otherwise coordinate payload signing. The signing service 152 can optionally create the signed payload (e.g., by aggregating the payload and the signature) or provide the signature to another component for signed payload creation.

In some variations, one or more of the components of the system (e.g., node 120) are implemented as a hardware device that includes one or more of a processor, a display device, a memory, a storage device, an audible output device, an input device, an output device, and a communication interface. In some variations, one or more components included in a hardware device are communicatively coupled via a bus. In some variations, one or more components included in the hardware device are communicatively coupled to an external system via the communication interface.

Processors can include one or more of a CPU (central processing unit), GPU (graphics processing unit), NPU (neural processing unit), and any other suitable processing system that functions to execute machine-readable instructions.

The communication interface functions to communicate data between the hardware device and another device via a network (e.g., a private network, a public network, the Internet, and the like).

In some variations, the storage device includes the machine-executable instructions for performing at least a portion of the method 300 described herein.

In some variations, at least one component of the system performs at least a portion of one or more of the methods described herein.

As mentioned herein, the term "standardized" or "standard" refers to a set of requirements for implementing a technical feature(s) or operation(s) to facilitate interoperability and interaction among various components of a given computing system and/or computing environment. In the context of a standard API, such a standard API can define a set of interactions amongst software and/or hardware components, and also define calls, requests, data formats, parameters, and the like, to enable such interactions between the components.

The system (and/or API) can optionally implement or utilize a set of standard data objects. Data objects implemented by the system can include one or more of the following data objects: block, transaction, operation, balance, account, amount, currency, and options. However, the system can implement any suitable set of data objects. A data object as mentioned herein can include a region of storage (or memory) that includes data corresponding to one or more values and/or other information.

A block object can include an array of transaction objects that occur at a block identified by a block identifier or a partial block identifier (e.g., an index or hash of the block). In some variations, the block identifier uniquely identifies the block in a particular blockchain network (identified by the network identifier). For blockchains with sharded states (e.g., split into partitions), a block in a particular shard of the particular blockchain network can optionally be further identified using a subnetwork identifier that identifies a specific shard within the blockchain network. The block object can optionally be associated with: a parent block identifier (identifying a particular block immediately preceding the identified block), timestamp, set of transactions (e.g., within the block), metadata (e.g., transaction root, difficulty), and/or other data.

A transaction object can include an array of operation objects that are attributable to a same transaction identifier. The transaction identifier can uniquely identify a transaction in a particular blockchain network and block (or in a mempool). The transaction object can optionally be associated with a transaction size, a locktime, and/or other data. In a first variation, the transaction can be fetched by hash. In a second variation, the transaction can only be fetched with a block identifier (e.g., because transaction parsing can change based on which block contains the transaction); alternatively, the node can infer the block to use, maintain a cache of historical transaction identifiers (and/or block identifiers) within the API server, and/or otherwise manage transaction retrieval.

Operation objects can include all balance-changing information within a transaction (e.g., asset transfer), and can optionally include or exclude non-balance changing operations (e.g., staking, voting for governance, nominating validators, and the like). In some implementations, operations are one-sided and only affect one account identifier (e.g., uniquely identifying an account within a blockchain network, such as an address, and the like) and/or subaccount identifier (e.g., specifying the account state specific to a contract address and/or stake). For example, a transaction from a first account to a second account would be represented by a first operation reducing a balance of the first account and a second operation increasing a balance of the second account for the same amount. In some variations, the operation objects for the first account and the second account include data that relates the two operations to each other as part of a single transaction. In some implementations, an operation can succeed or fail independently from a transaction. An operation object can be identified by an operation identifier (e.g., uniquely identifying an operation within a transaction), or otherwise identified. The operation object can include one or more of an array of related operation objects, a network-specific operation type identifier, a network-specific status of the operation identified by the operation identifier, at least one account identifier, and at least one amount.

A balance object can include an array of amount objects that are controlled by an account identifier.

In some implementations, the system implements an account balance process that receives account balance requests, and provides account balance responses as a result of processing account balance requests. In some implementations, an account balance request identifies an account identifier, and the corresponding response identifies each balance object associated with the account identifier. A response can optionally include a block identifier for the block at which the amounts for the balance object were calculated. In some implementations, a historical balance lookup can be performed by providing an account balance request that specifies a block identifier.

An amount object can include a value and a currency identifier. Accordingly, a single account may have a balance in multiple currencies. The currency identifier preferably identifies a cryptocurrency asset, and can include: a symbol, decimals, and/or other information. The symbol can be representative of the cryptocurrency asset. The symbol can be specific to the network identifier (e.g., wherein each identified network is associated with a predetermined list of acceptable symbols), automatically filled in based on the identified network (e.g., wherein the network uses a single asset or default asset), or otherwise specified. The decimals value can be used to convert the value from atomic units (e.g., indivisible cryptocurrency assets, such as Satoshis) to standard units for the identified network identifier (e.g., Bitcoins). The decimal value can remain unspecified for some blockchains (e.g., where no atomic units exist) or be otherwise managed. In some implementations, a value cannot be specified in an API call without a currency identifier; however, the value can be otherwise specified.

An options object (e.g., node API server 111) can identify one or more of the following: supported methods, error codes (e.g., error codes for which an operation should be retried), operation statuses, and operation types, and all possible transaction submission statuses. In some variations, the options object is used by clients (e.g., node API client 140, blockchain application module 160, node API validator 171) to validate the correctness of the node API integration. In some implementations, it is expected that these clients will error if they receive some response from the system that contains a method, operation status, and operation type, or transaction submission status that is not identified by the options object.

API endpoints can include one or more of: a network endpoint, a blocks endpoint, an accounts endpoint, a mempool endpoint, a construction endpoint, and/or can implement any suitable endpoint.

The network endpoint functions to provide blockchain network information (e.g., for initial third party connection). Network information can include: a network list, network options (per supported network or subnetwork), network status (per supported network or subnetwork), and/or other information. Network endpoints can include: a network identifier endpoint, a network status endpoint, a network options endpoint, and/or other endpoints). The network identifier endpoint can return a network list, which can include one or more network identifiers of blockchain networks (or subnetwork identifiers of subnetworks) supported by the API server (e.g., network identifiers for blockchain nodes' connected to the API server, compatible with the standard API format, and the like). The network identifier endpoint can include: a network status endpoint, a network option endpoint, and/or other endpoints to access network data (e.g., for networks listed in the network list). The network status endpoint can function to provide a network status for a specified network identifier. Network status can include a block height, most recent block identifier, version number, or any other suitable network status information. The network options endpoint can return a network options object for a specified network identifier, the version information and allowed network-specific types for a network identifier, network-unique options, and/or other data.

The blocks endpoint can function to return at least one block for a specified network identifier (e.g., all blocks, the current block, a specified block, and the like) or transaction for a specified network identifier and block. In some implementations, the API server can optionally provide a block transaction endpoint that functions to return a transaction in a block based on a transaction identifier (and optionally, block identifier).

The construction endpoint can be used (e.g., by the transaction constructor 150, the blockchain application module 160, and the like) to retrieve metadata needed for an account to construct a transaction, and used to submit signed transactions. Metadata can include any information required to construct a transaction for a specific network. Metadata can include recent hash to use, an account sequence number, or even arbitrary chain state.

The mempool endpoint can be used to fetch any date stored in a mempool for a blockchain. The mempool endpoint can be used to get one or more transaction identifiers in the mempool.

In some variations, several blockchain nodes can each include (or communicate with) their own dedicated API server 111, and an application module or API client can communicate with each node server using the same API. In an example, blockchain nodes of different blockchain networks (e.g., Bitcoin, Ethereum, Tezos, Cosmos, and the like) can each include their own API server 111 that functions to communicate with API clients (and blockchain applications e.g., blockchain application module 160) by using a standardized blockchain node API. Alternatively, all blockchain networks can leverage the same API server 111 to interact with different application modules 160. In this manner, integration of an application with a new blockchain network can be performed without requiring any (or significant) code changes if the nodes of the new blockchain network implement the standardized blockchain node API.

4. Methods.

Figure 2:
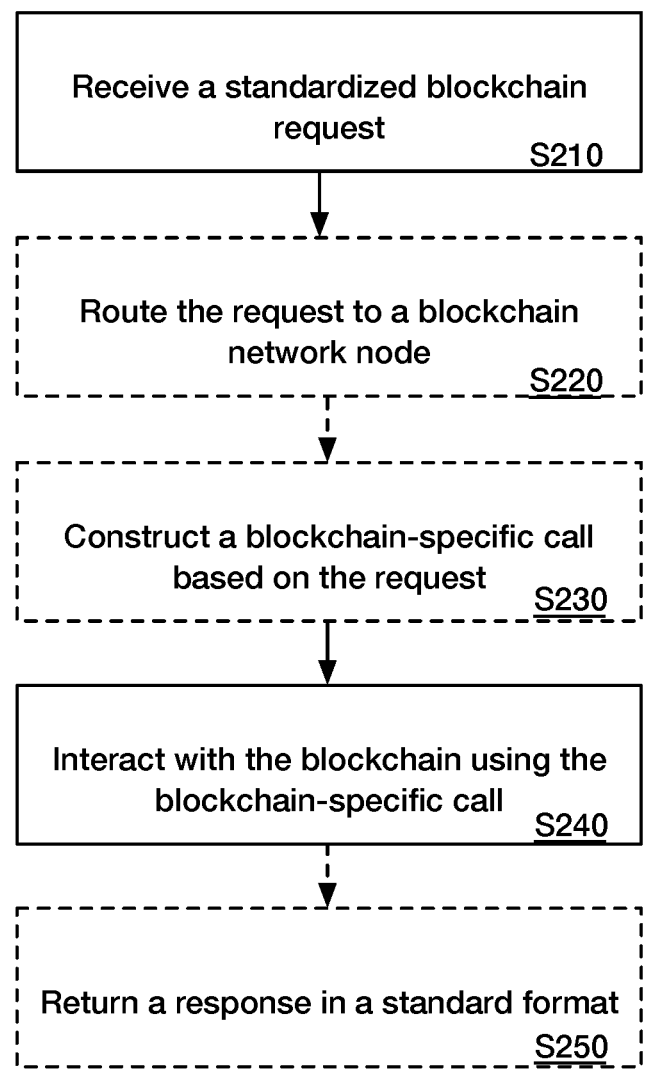
FIG. 2 is a representation of a method, which can be performed by various components of the system, in accordance with various embodiments.

FIG. 2 shows a representation of a method 200 in accordance with some embodiments.

The method 200 can include one or more of: receiving a standardized blockchain request identifying a blockchain network S210, routing the request to a node synced with the blockchain network S220; constructing a blockchain-specific call based on the standardized blockchain request S230; interacting with the blockchain network using the blockchain-specific call S240; and returning a response to the blockchain-specific call in a standardized format S250. The method 200 can optionally include determining whether the blockchain-specific call has been completed based on information included in the response. The method 200 can optionally include validating a standard API implementation. At least one component of the system can perform at least a portion of the method.

All or portions of the method can be performed offline (e.g., disconnected from the Internet, disconnected from the blockchain network, offchain, etc.) or online. For example, most of the API calls can be executed offline (e.g., off-chain) except for those requiring blockchain interaction (e.g., interrogating the current chain state, reading transaction construction metadata off the chain, transmitting a signed transaction to the chain for validation, etc.).

In variants, receiving a standardized blockchain request identifying a blockchain network S210 includes the blockchain application module 160 making a request, in accordance with the standard API format, to the node API server 111. The request can include: the blockchain (e.g., Bitcoin, Ethereum, etc.), the blockchain network (e.g., mainnet, testnet, etc.), a standard call (e.g., call in the standardized format; a data API call, a construction API call, etc.), call values (e.g., transfer amount), and/or other information. The call can be a call to read information from the blockchain (e.g., using the data API), a call to write information to the blockchain (e.g., using the construction API), and/or any other suitable call.

In turn, the node API server 111 can route the request to a node 120 (S220), which is synced to the identified blockchain network S210. However, the request can be routed to the node 120 by the blockchain application module 160, the requesting system, and/or by any other suitable system. Routing the request to the node 120 can include: identifying a node cluster associated with the identified blockchain network, and selecting a node from the node cluster. The node 120 can be selected: randomly, using a load balancing selection process, based on geolocation, using a prioritized list, and/or otherwise selected. However, the request can be otherwise routed to the node.

A blockchain-specific call can optionally be constructed based on the request (S230). The blockchain-specific call is preferably generated by the node API client 140 associated with the node 120, but can alternatively be generated by the conversion interface 146, by the node API server 111, and/or by any other suitable system. Constructing the blockchain-specific call can include: converting the standard call to a blockchain-specific call using a lookup table, parser, or other conversion mechanism (e.g., construct an Ethereum transfer call from a standard transfer call); changing the standard call to a blockchain-specific format; initiating downstream processes associated with the standard call to generate a blockchain-specific response (e.g., creating a signed transaction); and/or otherwise constructing the blockchain-specific call.

In variations, constructing the blockchain-specific call S230 involves the node API client 140 identifying a set of signing requirements based on the blockchain network. In an example, the node API client 140 utilizes the construction API 144, which supports detached key management (e.g., key generation and signing), and provides a set of payload data to sign during constructing the blockchain-specific call as discussed below. The standard API format specifies a format of each signature type(s) associated with various blockchain networks. As discussed before, in implementations where the blockchain application module 160 includes an API client, the blockchain application module can utilize the included API client in the same manner described above with respect to the node API client 140.

In variants, the construction API 144 provides detached, curve-based key generation and signing, which in some implementations disables access to private keys and ensures that the construction API 144 interacts with public keys and signatures in standardized formats (e.g., defined by the standard API format). Supported curve types include: secp256k1: SEC compressed, secp256r1: SEC compressed, edwards25519, tweedle, and the like. Supported signature types include: ecdsa, ecdsa_recovery, ed25519, schnorr_1, schnorr_poseidon, and the like. Further, in some implementations, the construction API 144 is extensible such that other curve types and/or signature types can be supported by the construction API 144.

A key that that conforms to the set of signing requirements for the identified blockchain network can be identified for use in signature generation. The key can be identified by the node API client 140, using the construction API 144; the signing service; and/or by another component. In some implementations, the set of signing requirements includes an account identifier and/or a signature type. Constructing the blockchain-specific call S230 includes the blockchain application module 160 signing, using the key, a set of payload data associated with the blockchain-specific call, and providing the signed set of payload data for including with the blockchain-specific call. Alternatively, the blockchain application module 160 can directly utilize the signing service 152 to sign the set of payload data. Alternatively, the node API client 140 can perform the signing on behalf of the blockchain application module based on the set of signing requirements.

In variants, constructing the blockchain-specific call S230 includes the node API client 140 generating a metadata request, the metadata request including a set of operations (e.g., an array of operations or operation objects) to retrieve metadata associated with the blockchain network 180, and retrieving the metadata associated with the blockchain network using the metadata request, where constructing the blockchain-specific call is based at least in part on the metadata. In some implementations, the node API client 140 provides the metadata request to the data API 142 or construction API 144 to request (any) information required to construct a transaction for the blockchain network 180. Examples of metadata include a recent hash, an account sequence number, and/or a chain state, and the like. It is appreciated that other types of metadata can be requested depending on the requirements of the transaction for the blockchain network 180.

The construction API 144 then generates a set of payload data based on the retrieved metadata. In a specific implementation, the node API client 140 utilizes a set of operations (e.g., operation objects or array of operations) and the retrieved metadata to generate the set of payload data. The construction API 144 returns an unsigned transaction blob and a collection of payloads for signing based on the signing requirements discussed previously above. The node API client 140 can forward the unsigned transaction blob and the collection of payloads to the blockchain application module 160 where each payload from the collection of payloads is signed. Alternatively, the node API client 140 can sign each payload from the collection of payloads. The signed payloads are combined along with the transaction blob to generate a signed transaction, which is included as part of the blockchain-specific call. Alternatively, as discussed before, in implementations where the blockchain application module 160 includes an API client, the blockchain application module 160 can utilize the included API client in the same manner described above with respect to the node API client 140.

Additionally, in some implementations, constructing the blockchain-specific call S230 includes generating an unsigned transaction for the blockchain network based on information identified by the standardized blockchain request, and facilitating signing of the unsigned transaction with a private key associated with a wallet based on the information identified by the standardized blockchain request, where the signed transaction is utilized when constructing the blockchain-specific call based on the standardized blockchain request. This can be performed by the node API client 140, the transaction constructor 150, an included API client, the blockchain application module 160, and/or other component.

The blockchain-specific call is then used to interact with the blockchain network (S240). This is preferably accomplished via the blockchain node 121, but can be otherwise accomplished. In a first variation, interacting with the blockchain network 240 includes reading information off the blockchain node 121. In this variation, the blockchain-specific call can be passed to the blockchain node 121, wherein the blockchain node 121 can return the requested information (e.g., in a blockchain-specific format, in a standard format, etc.). In a second variation, interacting with the blockchain network S240 includes writing information specified in the blockchain-specific call to the blockchain via the blockchain node 121. For example, this can include broadcasting the signed transaction to the blockchain network 180 by the blockchain node 121. In an implementation, the blockchain application module 160 and/or node API server 111 calls the construction API 144, which generates and sends the signed transaction to the blockchain network 180 for broadcast to the associated blockchain.

In some variations, interacting with the blockchain network S240 includes a transaction involving a smart contract. In an example, the node API client 140 receives a second standardized blockchain request (e.g., from the blockchain application module 160) to determine a set of operations for interacting with a smart contract associated with a second blockchain network. Based on the received second standardized blockchain request, the node API client 140 determines the set of operations (e.g., by using the construction API 144) for interacting with the smart contract. Alternatively, when the blockchain application module 160 includes an API client, the blockchain application module 160 can utilize the included API client in the same manner described above with respect to the node API client 140.

In variants, the node API client 140 returns a second response, including the set of operations, to the second standardized blockchain request to the blockchain application module 160. Examples of the operations in the set include: a balance calculation associated with an account, confirming transaction receipt, retrieving information from the smart contract (e.g., state, balance, etc.), accessing stored data, delegating or staking, messaging, creating, changing the smart contract, self-destructing, operations enabled by Solidity™, and/or other operations. The node API client 140 receives a third standardized blockchain request (e.g., from the blockchain application module 160) identifying at least one operation, from the set of operations, to perform with the smart contract. The node API client 140 constructs a second blockchain-specific call based on the third standardized blockchain request. Alternatively, the transaction constructor 150 constructs the second blockchain-specific call. The node API client 140 interacts with the second blockchain network (e.g., via a blockchain node) using the second blockchain-specific call to perform the at least one operation with the smart contract. The blockchain node returns a third response to the second blockchain-specific call in the standardized format to the node API server in, which forward the response to the blockchain application module 160. Alternatively, when the blockchain application module 160 includes an API client, the blockchain application module 160 can utilize the included API client in the same manner described above with respect to the node API client 140.

Additionally, the node API client 140 can, based on the standardized blockchain request, identify a second blockchain network, the blockchain network and the second blockchain network being different blockchain networks. In variants, the blockchain network is an unspent transaction output (UTXO) based chain and the second blockchain network is an account based chain. The node API server 111 routes the request to a second node synced with the second blockchain network. Utilizing a construction API (which in this example can be provided by the second node) which is in compliance with the standard API, the node API client 140 of the second node constructs a second blockchain-specific call based on the standardized blockchain request. The node API server interacts with the second blockchain network using the second blockchain-specific call, and returns a second response to the second blockchain-specific call in the standardized format to the blockchain application module 160.

The blockchain node 121 returns a response to the blockchain-specific call in a standardized format S250 to the node API server 111, which forwards the response to the blockchain application module 160. Alternatively, the node API server 111 forwards the response to the node API client 140, which forwards the response to the blockchain application module 160.

In a variation, the blockchain node 121 can determine whether a transaction (e.g., a signed transaction) associated with the blockchain-specific call is finalized. In some variations, the protocol of the blockchain network or heuristics associated with the blockchain network defines finalization states for blockchain transactions. Finalization can be blockchain-dependent, be blockchain-agnostic, or be otherwise related to different blockchains. Examples of finalization include: probabilistic finality (e.g., less than a predetermined probability of the transaction being reverted), absolute finality (e.g., in PBFT-based protocols), economic finality (e.g., when the cost of reverting the block exceeds a predetermined cost, measured in fiat, computing resources, or another resource), or other finality types. In some implementations, finalization of the transaction involves the blockchain node 121 updating a ledger of a database to include an entry for the transaction to the account generating the transaction (and optionally an account or address that is the source of the assets/funds transferred by the transaction). In some variations, the blockchain node 121 receives information about blocks recorded by the blockchain network 180, and determines whether a signed transaction has been finalized based on the information about blocks recorded by the blockchain network 180. In some variations, the blockchain node 121 determines whether the signed transaction has been finalized in accordance with a protocol for the blockchain network 180.

In some implementations, responsive to finalization of the transaction, the blockchain node 121 provides a transaction finalization notification for the transaction to the node API server 111, which forwards the transaction finalization notification to the blockchain application module 160.

Figure 3A:
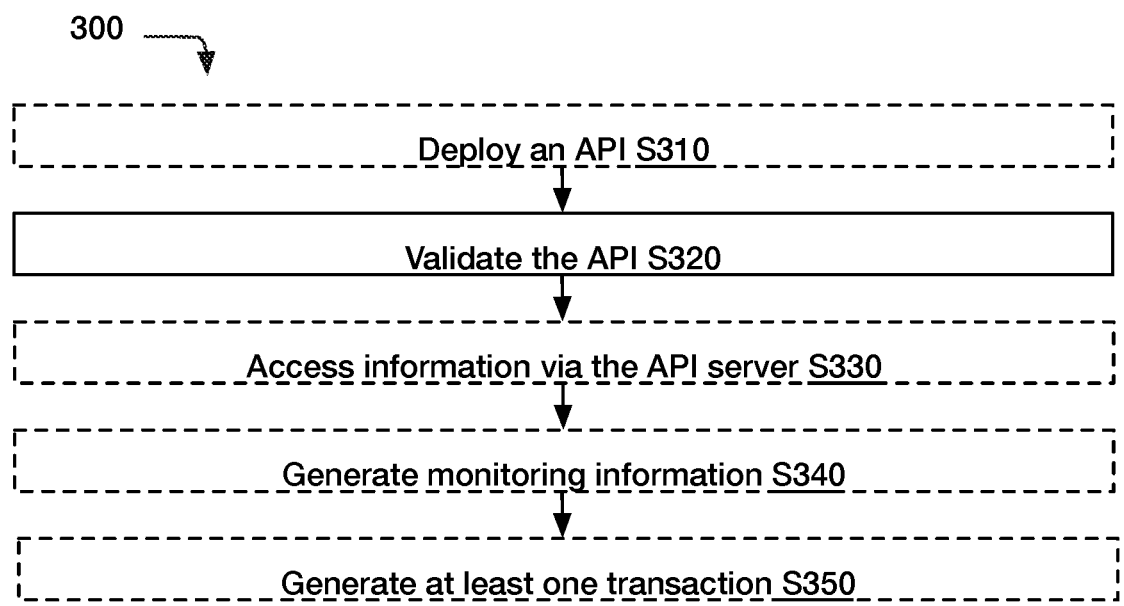
FIGS. 3A-B, 4 and 5 are representations of a method, in accordance with various embodiments.
Figure 3B:
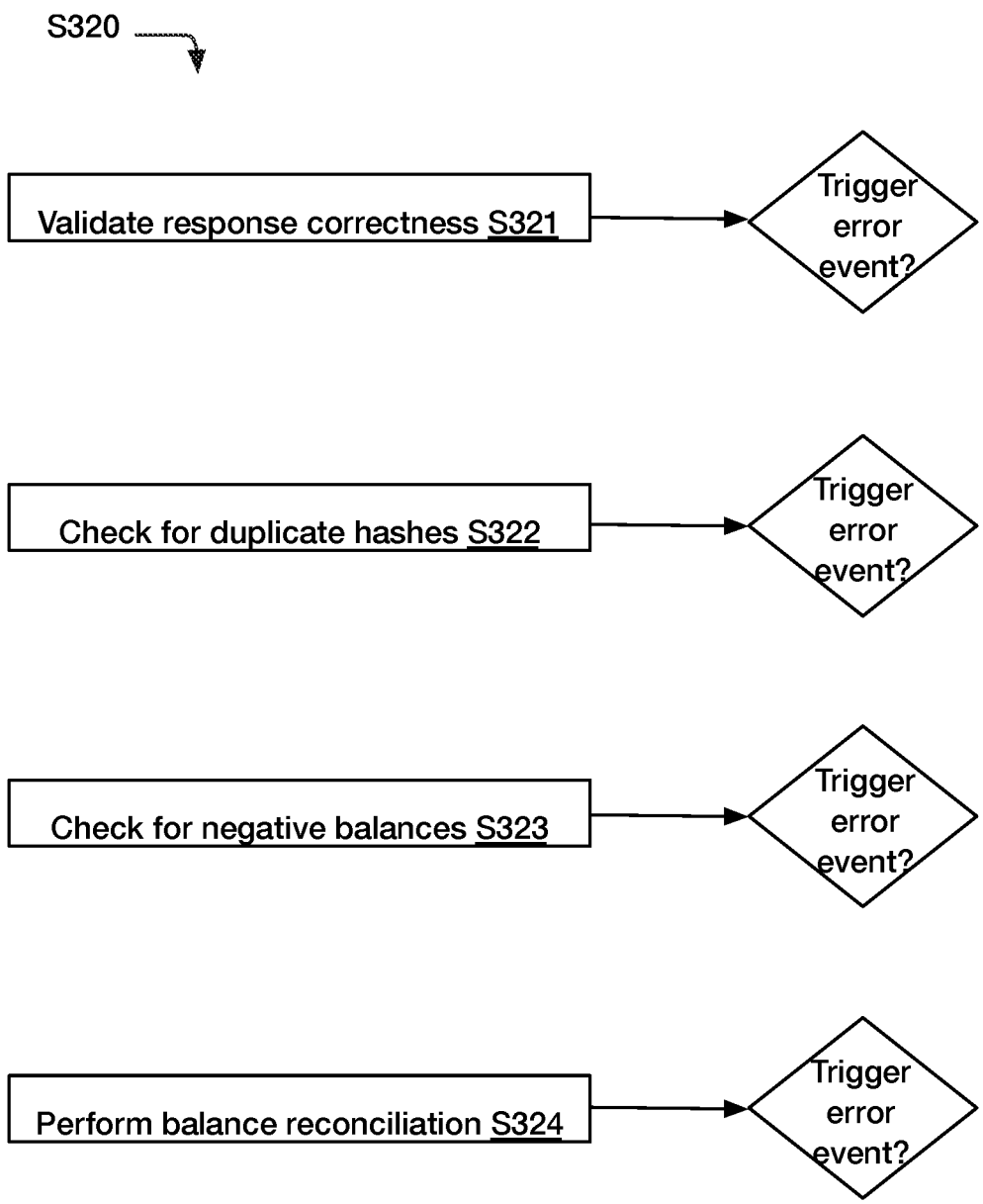
Figure 5:
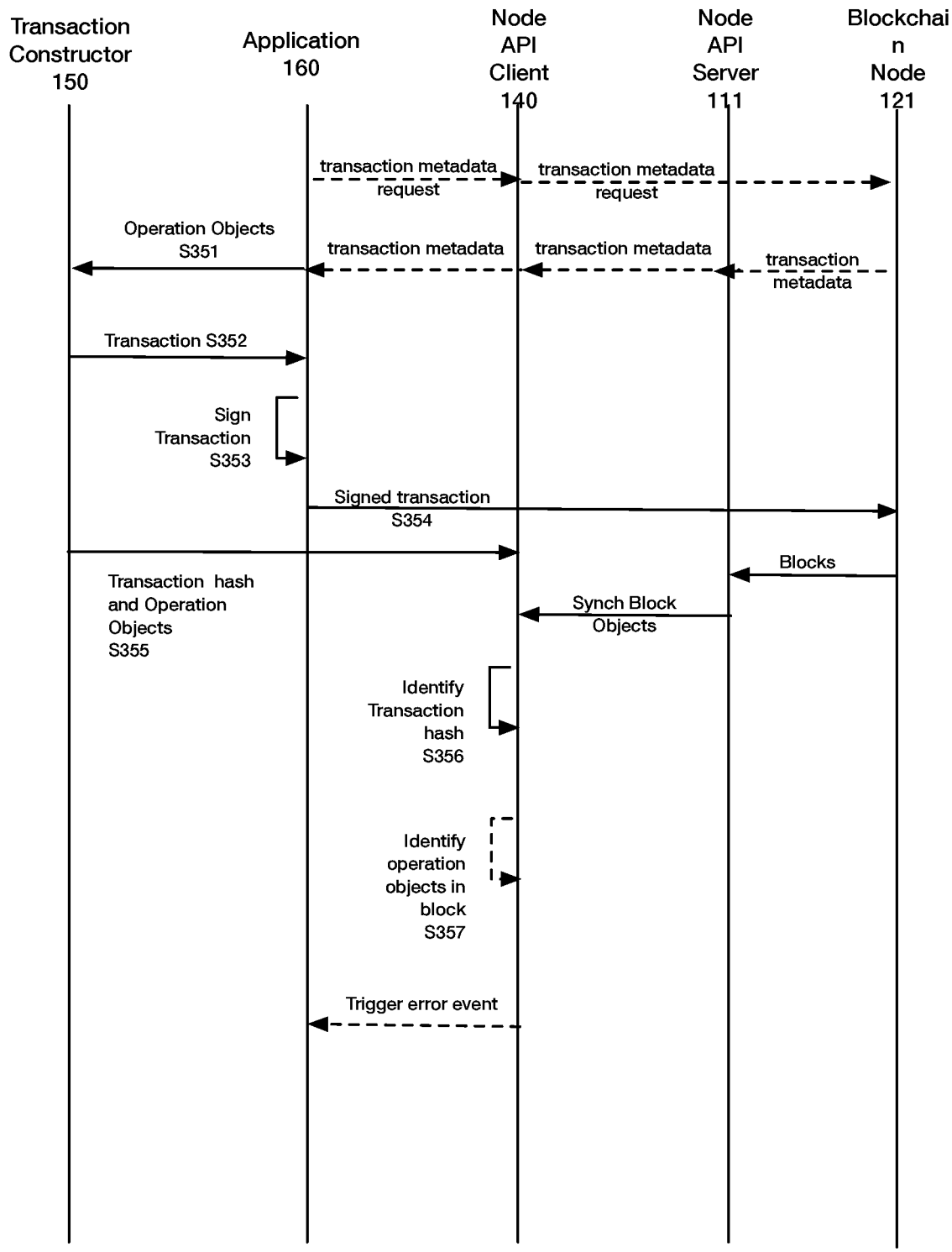
Figure 6:
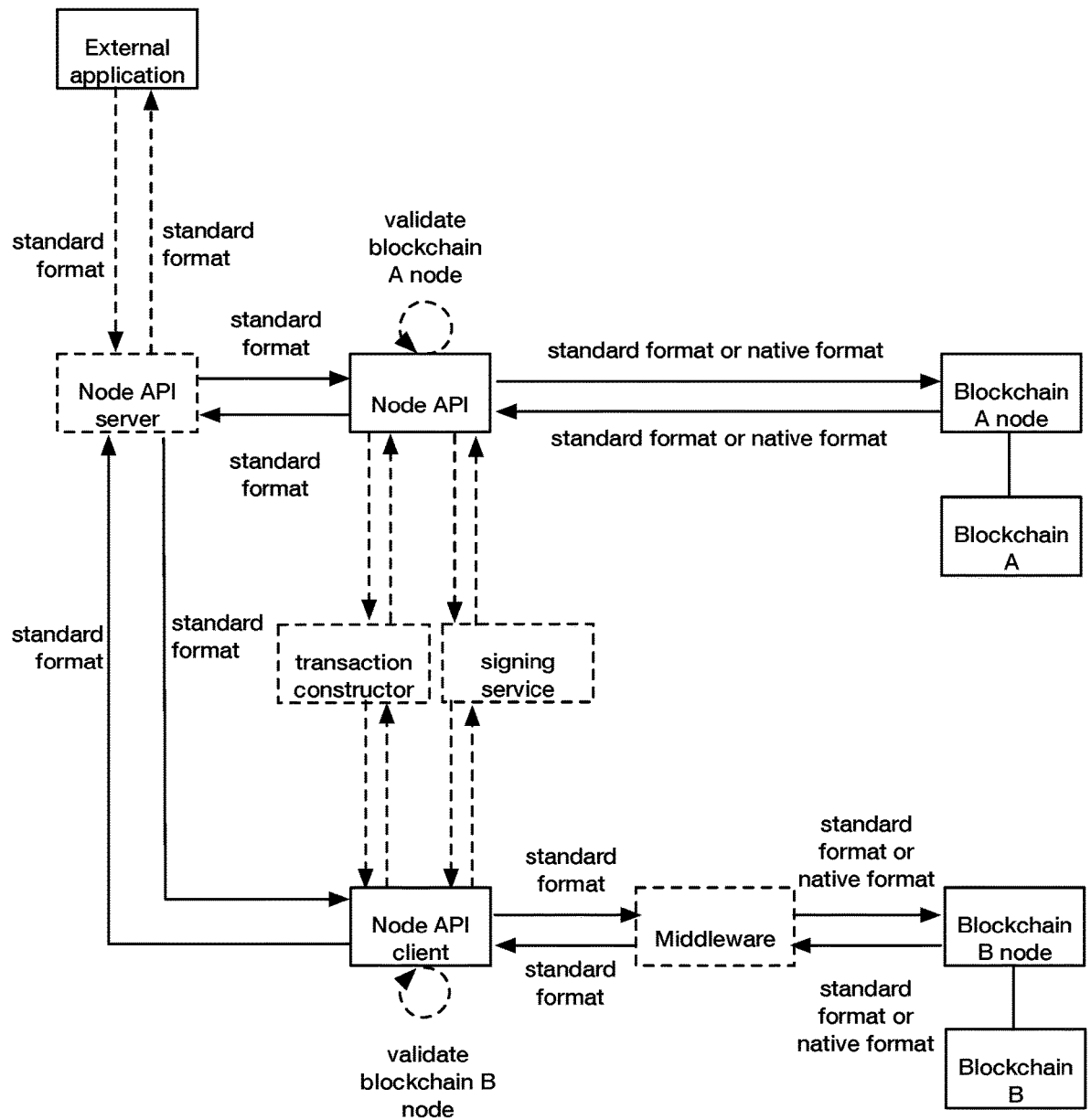
FIG. 6 is a schematic representation of an example of the system and methods in use by a third party, where third party interfaces with different cryptographic protocols on different blockchains (e.g., Blockchain A and Blockchain B) using the same request and response format.

FIGS. 3A and 3B show representations of a method 300 in accordance with embodiments. FIGS. 5 and 6 show examples of the method 300.

The method 300 can include one or more of: deploying an API (e.g., implemented by a blockchain node, middleware, an API server) S310, validating the API S320; accessing information via the API server S330; generating monitoring information S340; and generating at least one transaction S350. The method can optionally include validating the blockchain node (e.g., using the API server). At least one component of the system can perform at least a portion of the method.

In a first variation, deploying the API includes deploying a node API server that implements the API. The node API server can communicate with an external blockchain node, and the corresponding API server and the blockchain node can be deployed simultaneously (e.g., by deploying a single container that starts the node and the API server without human intervention). However, the API can otherwise be deployed. In a second variation, deploying the API S310 includes deploying a blockchain node that implements the functionality of the node API server. In other words, the blockchain node can include a module that functions as a node API server.

In a specific example, the API server and the blockchain node are deployed in a single, shared computing environment (e.g., container, virtual machine, bare metal machine, and the like) (e.g., for easier multiple node orchestration). In this example, all data can be stored to a predetermined directory (e.g., /data directory), such that the blockchain data can be reliably accessed and retrieved. In this example, the blockchain protocol preferably enables historical state pruning using block-height-based configuration settings (e.g., the node can delete historical block states over a threshold block age), but can alternatively enable other storage management features. Alternatively, the API server and blockchain node can be deployed in different computing environments.

One or more of a node API validator (e.g., node API validator 171), a node API client (e.g., node API client 140), and a blockchain application module (e.g., blockchain application module 160), can validate the API at S320. In a first variation, validating the API includes validating a node API server that implements the API. In a second variation, validating the API includes validating a blockchain node that includes a module that functions as a node API server.

Validating the API S320 can include performing at least one correctness check for the API server (e.g., an API server implemented as a module separate from a node or an API server implemented as a module included in the node). In some variations, if a correctness check fails, the component performing the validation generates a log entry or notification that identifies the error. Validating can be performed before deployment of an API server (e.g., to ensure that the API server is operating correctly) (e.g., by using a node API validator 171 operated by a developer of the API server). Additionally, or alternatively, validating can be performed after deployment of an API server (e.g., continuously, periodically, in response to a command, in response to a triggering event, and the like) (e.g., by using a node API client 140 or a blockchain application module 160) to monitor the performance of the API server and perform an action in a case where validation fails for a deployed API server. S320 can optionally be applied to a blockchain node (e.g., executing a blockchain protocol, such as an updated blockchain protocol version) instead of an API.

Figure 4:
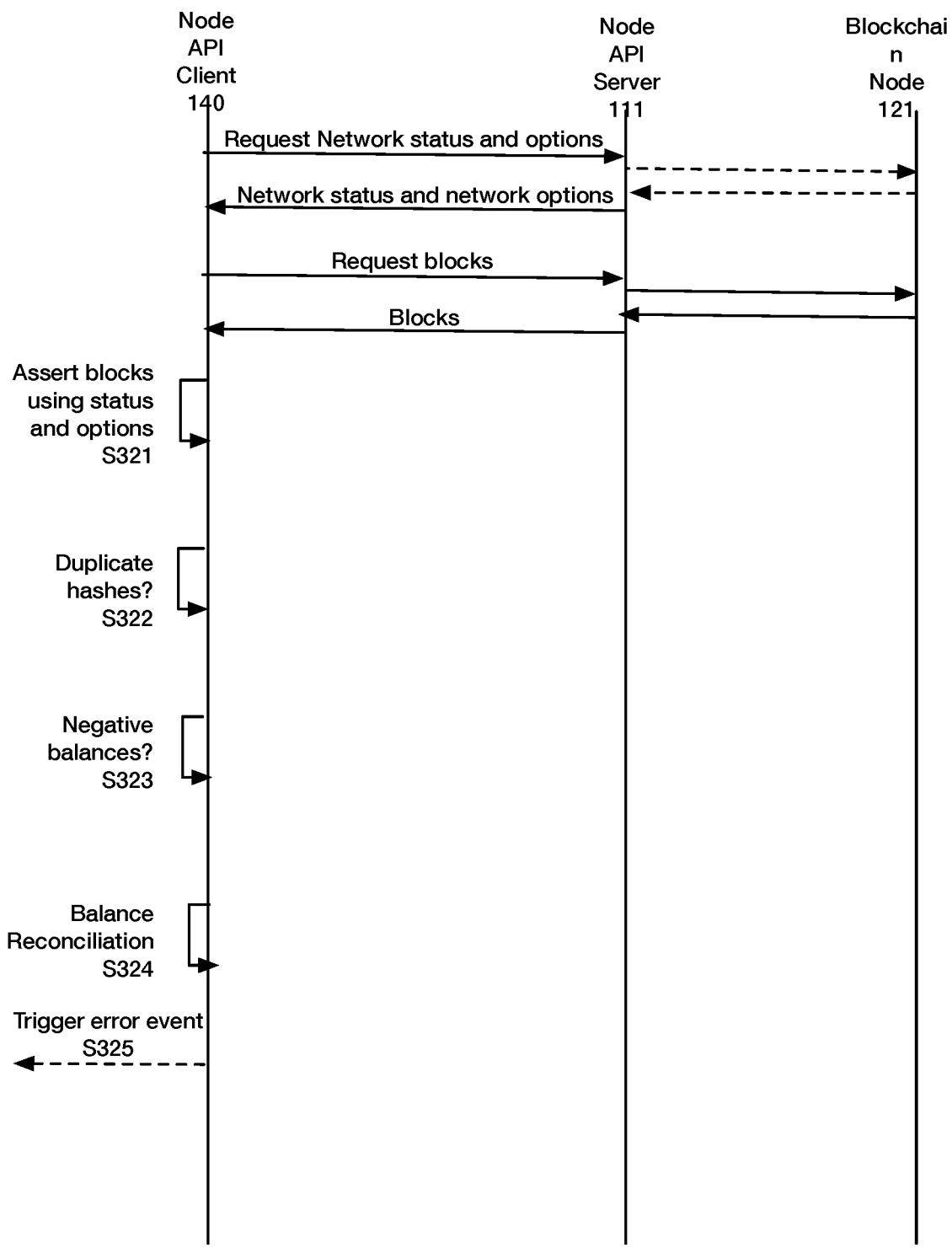

Validating the API S320 can include one or more of validating response correctness S321, checking for duplicate hashes S322, checking for negative balances S323, and performing balance reconciliation S324 (e.g., as shown in FIG. 3B and in FIG. 4).

In variations, validating the API S320 (e.g., for the construction API 144) includes the node API validator 171 receiving, via a command line interface, a validation request to validate a construction application programming interface (API) utilized for constructing the blockchain-specific call. The node API validator 171 determines a set of parameters associated with the validation request, the set of parameters stored in a configuration file. The node API validator 171 validates the construction API based at least in part on the set of parameters. Similarly, the node API validator can perform the aforementioned to validate the data API 142 when receiving, via the command line interface, a validation request to validate a data API (e.g., the data API 142).

Validating response correctness S321 can include sending one or more API requests to the API client (e.g., for a blockchain protocol), receiving one or more responses from the API client, and asserting that each response adheres to the API standard used by the API client. In some variations, validating response correctness S321 can include requesting a network options object for a specified network identifier from a network options endpoint of the API client. Validating response correctness can further include identifying each method supported by the API client by using the network options object, sending an API request for at least one supported method, and asserting at least one response from the API client by using information included in the network options object. In some variations a network status for the network is accessed from the API client by using a network status endpoint, and the network status can be used to validate responses received from the API client. In some implementations, validating the API client includes accessing a block for a specified network by using the API client, accessing network status and network options for the network, and asserting the block by using the access network status and network options.

Asserting the block can include asserting that at least the transactions and operations identified in the block adhere to the API standard used by the API client.

Checking for duplicate hashes S322, can include accessing a block and confirming that a block hash of the block or a transaction hash included in the block is never duplicated. This can include: randomly selecting a hash for verification, caching a list of historical hashes and comparing each new hash on the blockchain with the historical hash, and/or otherwise performed.

Checking for negative balances S323, can include accessing a block, identifying account identifiers included in the block, identifying account balances for each account identifier for the previous block, identifying operations included in the block, and identifying any operation in the block that causes an account balance to become negative. In some variations the system checking for negative balances (e.g., node API client 140, blockchain application module 160, node API validator 171) can record balances for at least one account and identifier in an off-chain ledger. Alternatively, the system checking for negative balances can access account balances for the previous block from the API client.

Balance reconciliation S324 can be performed for active or inactive accounts. In some variations, performing balance reconciliation includes maintaining an off-chain ledger for at least one account. The off-chain ledger can be updated based on transactions generated by the blockchain application module 160 (or the transaction constructor 150), by using blocks (e.g., information included in operations included in accessed blocks) accessed via the API client, or in any other suitable manner.

Performing balance reconciliation for an account can include, accessing a first account balance for the account from a first source, accessing a second account balance for the account from a second source, and comparing the first and second balances for the account. If the balances are not equal, an error event is generated.

The account can bean active account or an inactive account. In some variations, balance reconciliation is performed for one or more randomly selected accounts. In some variations, balance reconciliation is performed for one or more accounts identified in a block that is being validated.

In some variations, the first source is an endpoint of the API client that provides an account balance (e.g., computed by the blockchain node 121). Account balances can be provided by one or more of an accounts endpoint that provides account identifiers for a specified network, a network endpoint that provides account identifiers for a specified network, a balances endpoint that provides account balances for a specified network, and the like. However, account balances can otherwise be provided by the API client.

In some variations, the second source is a ledger (e.g., the off-chain ledger) that computes balances for accounts based on blocks accessed via the API client. If an account is included in a block being validated, then the account's account balance from the previous block is accessed from the ledger, the account's ledger balance is updated based on operations for the account that are included in the block, and the account's updated ledger balance is compared with the account balance received from the endpoint of the API client (that provides the balance computed by the blockchain node 121). If an account is not included in a block being validated, then the account's account balance from the previous block is accessed from the ledger, and the account's ledger balance is compared with the account balance received from the endpoint of the API client. In a case where a balance computed by the blockchain node differs from a balance computed from blocks accessed via the API client, the API client is not operating properly (since it returns blocks with missing operations). In some variations, validation includes identifying one or more blocks provided by the API client that are missing operations for one or more accounts.

In a first example, balance reconciliation can include: computing the balance of an account based on the account's operations, retrieving the account balance from the blockchain node, determining whether the computed balance equals the retrieved balance, validating the node or blockchain when they are equal, and generating an error if not.

In a second example, balance reconciliation can include randomly retrieving balances of inactive accounts (e.g., accounts not involved in any transactions or balance-changing operations logged by the API client) from the blockchain node and comparing the retrieved balance to the last known balance. When the check fails (e.g., balance has changed), the API client can generate an error, automatically find the block missing an operation, or otherwise manage the error.

In an example, a node API validator (e.g., node API validator 171) can perform validation of an API client in a test environment (before deployment) by maintaining an off-chain ledger for one or more accounts, recording a set of transactions on a blockchain managed by the API client (for the accounts included in the off-chain ledger), updating the balances of the off-chain ledger based on the recorded transactions, accessing blocks recorded at the blockchain (buy using the API client), and computing on-chain balances for each account by using information included in the accessed blocks. The off-chain balances can be compared with the on-chain balances to determine whether one or more operations are missing from the blocks accessed via the API client, or whether additional operations are included in the blocks accessed via the API client. If the balances are not equal, then the blockchain can be traversed to identify a previous block for which the on-chain balance matches the corresponding off-chain balance. In such a case, the block following the identified block is determined to be missing an operation for the account.

Accessing information via the API client S330 can include one or more of fetching data via the API client, synching data by using the API client, and parsing accessed information. In some implementations, the accessed information has a JSON format. However, the information can be otherwise formatted. In some variations, information is accessed during validation of the API S320. In some variations, information access is blocked (e.g., by a node API client 140, a blockchain application module 160) if validation of the API fails at S320. For example, an error event can be triggered if validation fails at S320, and information access by a node API client 140 or an blockchain application module 160 halts until the error event is corrected or dismissed. Information can be accessed at S330 from an endpoint of the API client (e.g., by providing a request that identifies an API method implemented by the API client). Accessed information can include any suitable information, such as, for example, block data objects, transaction data objects, operation data objects, balance data objects, amount data objects, currency data objects, options data objects, and account data objects.

Accessed data can be parsed by using a parser (e.g., included in the node API client 140, and/or in the blockchain application module 160). In some variations, parsing can include extracting information matching specified terms (e.g., filtering terms, search terms, regular expressions, and the like). In an example, parsing can include extracting all transactions that transfer assets to a specified account, extracting all transactions that transfer assets from a specified account, grouping related operations, and the like.

Generating monitoring information S340 for anode 120 can include generating at least one of performance benchmarking information, performance changes, implementation modifications, validation information, or any other suitable monitoring information. The monitoring information can be for a specific node instance, the blockchain node 121, the blockchain network, and/or other component. Monitoring information can be generated based on one or more of: validation performed at S320, data accessed at S330, and/or other information. However, monitoring information can otherwise be generated. Monitoring information can be stored in a storage device (e.g., a repository, a log file, and the like), provided to an external system (e.g., as a notification), or used to trigger an action. For example, a rule or automated system can trigger an action based on generated monitoring information. In an example, monitoring information can be provided to other systems (e.g., other blockchain applications, such as exchanges, wallets, explorers) to notify such systems of issues (e.g., validation issues, performance issues, compliance issues, implementation changes, and the like) with a current (or identified) version of the node API client. Such information can be used by a blockchain application to revert to an earlier version of the API client, upgrade to a new version of the API client, update a parser used to parse information accessed via the API client, and/or execute other mitigation actions. Reverting or upgrading can include deploying a different version of the API server.

Generating at least one transaction S350 can be performed by using a transaction constructor (e.g., 150 shown in FIG. 1). The transaction constructor can be stateless (e.g., such that each invocation of a function in the transaction constructor will be a fresh invocation in a new execution environment), but can alternatively be stateful. The transaction constructor can be operable entirely online or offline (e.g., wherein dynamic information needed for transaction construction can be retrieved from the construction endpoint or otherwise determined). The transaction constructor can also support detached key generation and signing (e.g., wherein the transaction constructor constructs one or a series of standard or native payloads for signing). Generating a transaction S350 can include receiving a stream of operation objects S351 (shown in FIG. 5) and constructing a network specific blockchain transaction for a specified blockchain network S352 (e.g., as shown in FIG. 5). In an example, a blockchain application module 160 provides the stream of operation objects, and specifies a network identifier, and the transaction constructor 150 returns to the blockchain application module 160 a transaction for the specified network. The blockchain application module 160 can sign the transaction S353 and optionally broadcast the signed transaction to the blockchain network S354 (e.g., by using a blockchain node 121). In some variations, the transaction constructor stores a transaction hash of the generated transaction in association with the stream of operation objects, and optionally provides the transaction hash (and optionally the stream of operation objects) to one or more of the blockchain application module 160 and the node API client 140 S355. Block objects can be accessed via the node API server 11 to identify the transaction hash in an accessed block S356. If the transaction hash is included in a block, the block is parsed to see if the stream of operation objects are included in the block, and associated with the transaction hash S357. If the transaction constructed by the transaction constructor is recorded in the blockchain, then the stream of objects used to construct the transaction should be included in a block object accessed via the API server. If not, an error event is triggered.

FIG. 6 is a schematic representation of an example of the system and methods in use by a third party, where third party interfaces with different cryptographic protocols on different blockchains (e.g., Blockchain A and Blockchain B) using the same request and response format.

In this illustrative example, an external application (e.g., third party, client, caller, etc.) can send a first and second request for a first and second blockchain network, respectively, in a standard format to a central platform (e.g., implementing node API server 111). The requests can include: the blockchain network, the API calls, and optionally the parameter values for the API calls (e.g., payload to be signed and broadcast; block identifier to be interrogated; etc.).

The platform can: identify the first and second blockchain networks from the requests; identify a first and second blockchain node synchronized with the first and second blockchain networks, respectively (e.g., blockchain A node and blockchain B node, respectively); and send the first and second requests (in the standard format) to the first and second blockchain nodes, respectively.

The node API clients of the first and second blockchain nodes then convert the standard requests to blockchain-specific requests (e.g., consistent with the first and second blockchain protocols, respectively), if needed; and send the blockchain-specific requests to the respective blockchain nodes.

When the request is a write request, the node API clients can optionally construct a blockchain-specific message using a blockchain-specific construction flow or set of operations for the call. Constructing the blockchain-specific message can include: optionally requesting metadata (e.g., from the blockchain network, from the blockchain node, etc.); sending a request to a (detached or integrated) transaction constructor for message construction (e.g., according to a blockchain-specific template; including the metadata; etc.); sending a request to a (detached or integrated) signing service 152 for message signature; optionally aggregating the message and the signature to generate a signed message; and optionally validating the unsigned message, signature, and/or signed message. The node API clients can optionally monitor the blockchain nodes for a blockchain-specific response associated with the request (e.g., using a blockchain-specific and response-specific state machine, set of operations, or other monitoring method).

The blockchain nodes can then return responses in the standard format (e.g., if the API format is natively supported) or in a blockchain-specific format, wherein the node API client or conversion interface can convert the blockchain-specific format back to the standard format. The standard responses are then returned to the external application in the standard format.

Figure 7:
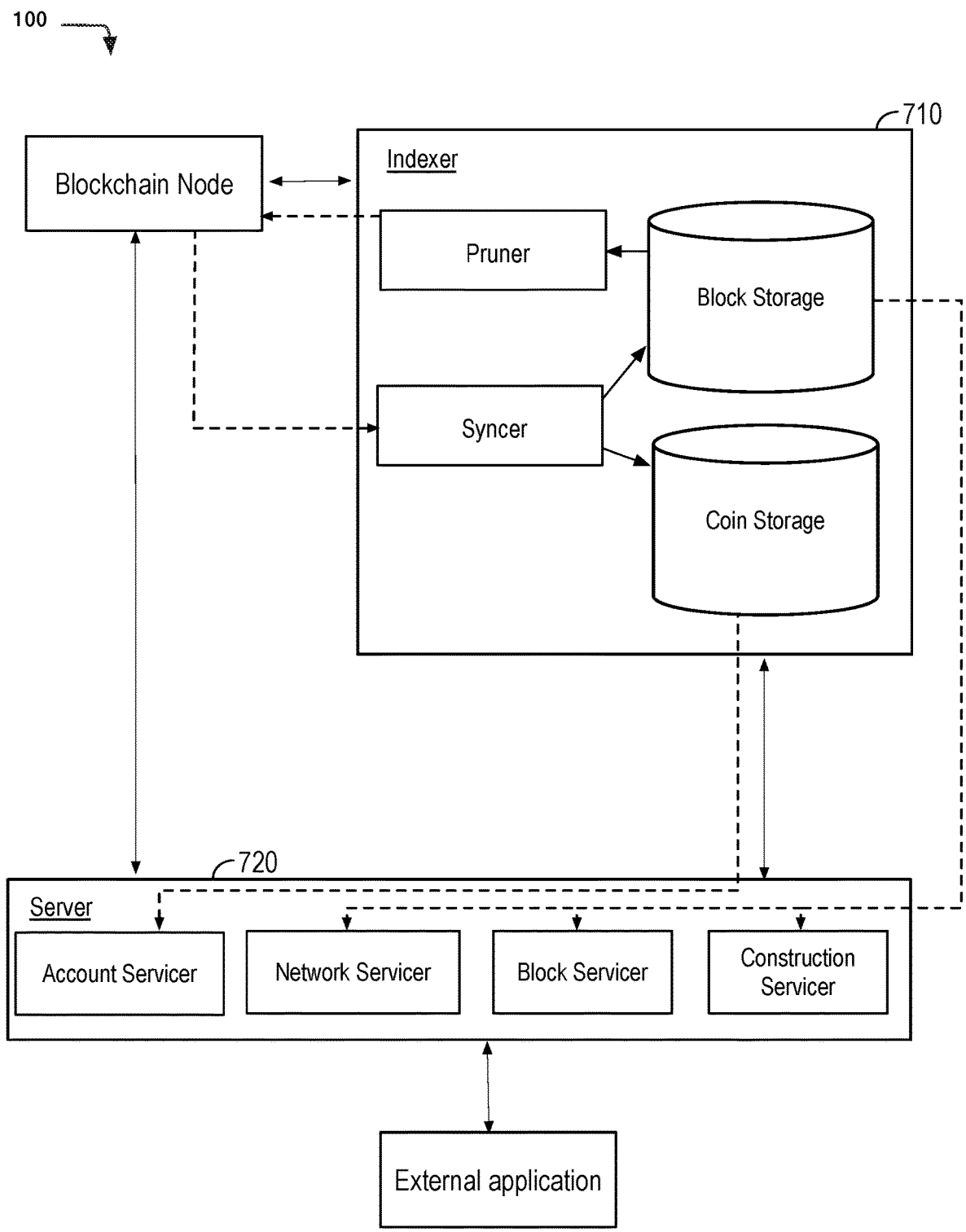
FIG. 7 is a schematic representation of an example of the system.

FIG. 7 is a schematic representation of an example of the system.

In some variations, the system provides one or more packages that an external application (or developer) can utilize to communicate with a central platform in the standard API format. In this illustrative example, an indexer and server which can implemented as respective packages, and include other packages therein. The external application and/or node implementation entity, in an example, installs and/or deploys these packages (e.g., in a development environment, computing environment, and the like), for enabling operations that are to be performed with the central platform.

In some variations, after the packages are deployed, an external application (e.g., blockchain application module 160, third party, client, caller, and the like) can send one or more requests in a standard format to a server 720 (e.g., implementing node API server 111). The requests can include: the blockchain network, the API calls, and optionally the parameter values for the API calls (e.g., payload to be signed and broadcast; block identifier to be interrogated; etc.) as discussed before, among other types of information or data.

In this example, the external application (e.g., the blockchain application module 160, or another third party or external application) interacts with the server 720. In some variations, the server 720 corresponds to a node API server (e.g., the node API server 111). In some variations, indexer 710 functions to index information received from at least one of a bitcoin node (e.g., blockchain node 121), or a blockchain service (not shown). As discussed before, the blockchain node communicates with a given blockchain network (e.g., the blockchain network 180) to receive information related to one or more blockchain transactions that are executed or broadcast on the blockchain network.

As shown, indexer 710 includes a pruner and a syncer, block storage database, and coin storage database. The syncer syncs information (e.g., blocks, block identifier, transaction, transaction identifier, network identifier, timestamp, operation(s), and the like) related to one or more blocks received from the bitcoin node 705, and stores the information (e.g., metadata) in the coin storage database and/or the block storage database. In an implementation, the syncer performs concurrent block ingestion (e.g., to speed up block syncing). Concurrent block ingestion enables multiple blocks to be populated ahead of the currently processing block while waiting for the most recently populated block to save. Moreover, since all ingested blocks are stored in a storage cache, duplicate data is not required to be stored in the block storage database.

The pruner receives information from the block storage database and performs pruning operations on the information. Optionally, the pruner can perform automatic pruning (e.g., remove blocks after ingestion to reduce storage space in the block storage database). The bitcoin node 705 sends information to the server 720 (e.g., related to one or more transactions on the blockchain network). Optionally, the server 720 communicates directly with the bitcoin node 705 in some variations.

As illustrated in this example, the server 720 includes an account servicer, a network service, a block servicer, and a construction servicer. In some implementations, the construction servicer communicates with the bitcoin node 705 to facilitate interactions in the standard API format between the external application 750 and the bitcoin node 705. The construction servicer provides an implementation of a construction API in some variations.

Figure 8A:
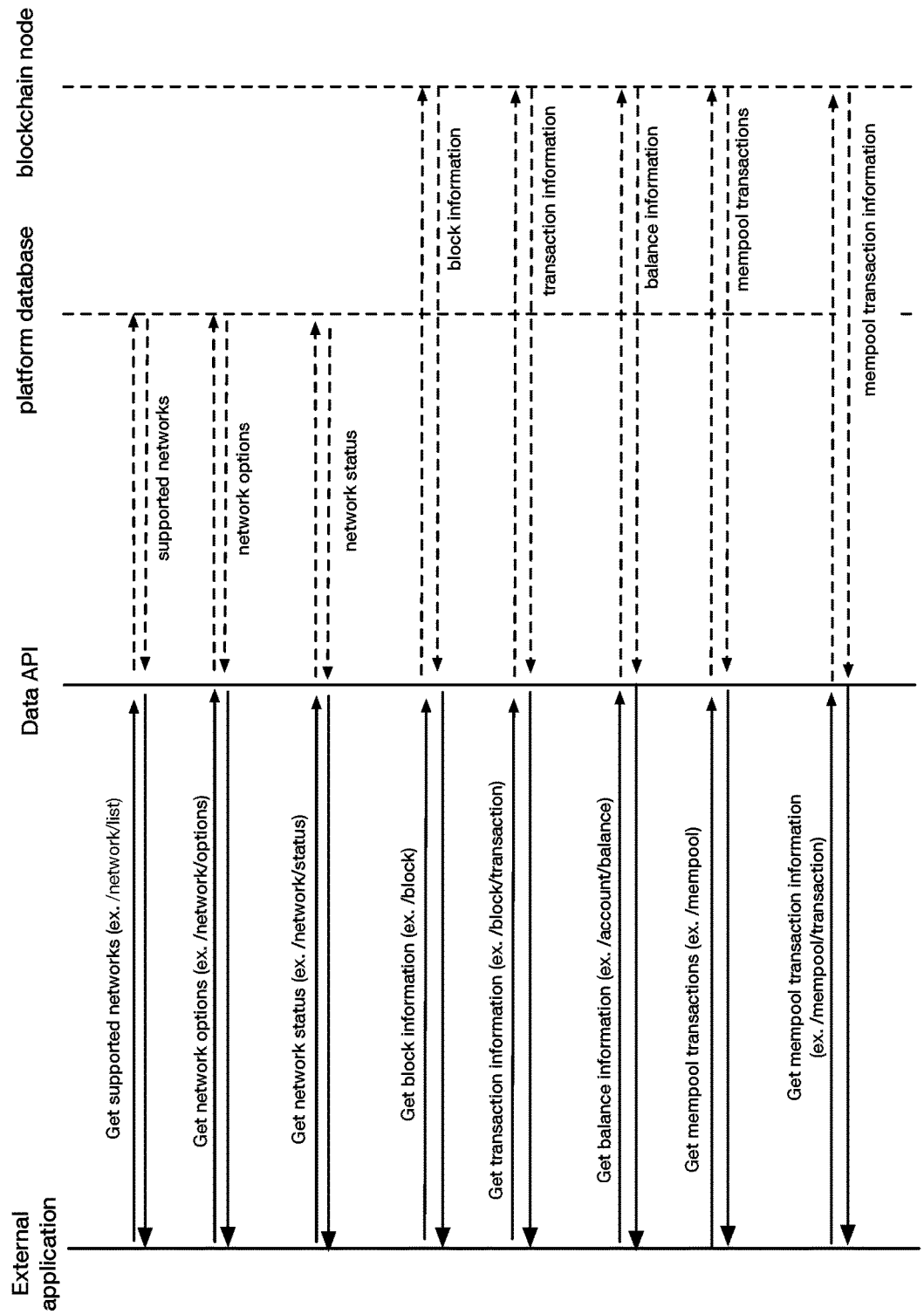
FIG. 8A is an illustrative example of querying data about the system and a blockchain.

FIG. 8A is an illustrative example of querying data about the system and a blockchain.

In this illustrative example, an external application (e.g., third party, client, caller, etc.) can send various requests for querying various data in a standard format to an implementations of the data API, which in turn communicates with a central platform (e.g., implementing node API server 111). As discussed before, the requests can include: the blockchain network, the API calls, and optionally the parameter values for the API calls (e.g., payload to be signed and broadcast; block identifier to be interrogated; etc.) as discussed before, among other types of information or data.

The external application sends one or more requests in a standard format to a given implementation of a data API (e.g., the data API 142). In some implementations, the data API provides one or more network endpoints that are utilized to determine which blockchain networks are supported, the current status (e.g., the most recent processed block, and the like) of the blockchain network, and/or any other metadata that may be provided.

In some variations, the external application sends a request in the standard format to retrieve a list of supported networks by the platform. The data API receives this request and queries a platform database for the list of supported networks. The platform database returns the list of supported networks to the data API in response to the query, and the data API forwards the list of supported networks to the external application. The list of supported networks can optionally include information related to blockchain networks (e.g., network name or string), network identifiers (e.g., subnetwork, shards, and the like), and/or other metadata (e.g., producer identifiers).

Next, the external application can optionally send a request in the standard format to retrieve networks options for an identified network from the one or more of the supported networks. In an example, the request can include a network identifier associated with the identified network (e.g., based on the list of supported networks discussed above). The data API receives this request and queries a platform database for the network options of the identified network. The platform database returns the network options of the identified network to the data API in response to the query, and the data API forwards the network options to the external application. The network options can include information related to version information (e.g., API version, node version, middleware version, other metadata), operation types, errors, historical balance lookup, timestamp (e.g., timestamp start index), call methods, balance exemptions (e.g., account address, currency, exemption type, and the like), mempool coins, and the like.

Additionally, the external application can optionally send a request in the standard format to retrieve a status of the identified network. In an example, the request can include a network identifier associated with the identified network (e.g., based on the list of supported networks discussed above). The data API receives this request and can return the network status of the identified network (e.g., from an internal database, a platform database, or other database). The network status can include information related to a current block identifier, current block timestamp, genesis block identifier, oldest block identifiers, sync status (e.g., current index, target index, stage, synced, and the like), peers (e.g., peer identifiers), and the like.

The external application can send a request in the standard format to retrieve block information for an identified block (e.g., based on the status of the identified network discussed above). In an example, the request can include a block identifier (e.g., blockchain, network, sub network identifier, shard, other metadata, producer, index, hash, and the like) associated with the identified block. The data API receives this request and sends a request for the same to a blockchain node (e.g., the blockchain node 121). The blockchain node returns the requested block information to the data API in response to the request, and the data API forwards the block information to the external application. The block information can include information related to block identifier (e.g., index, hash, and the like), parent block identifier, timestamp, transactions, operations (e.g., operation identifier, type, status, account, amount, coin change, coin identifier, coin action, other metadata, and the like), related transactions, other transactions, and the like.

Next, the external application can send a request in the standard format to retrieve transaction information for an identified block (e.g., based on the block information discussed above). In an example, the request can include a network identifier, block identifier, and/or transaction identifier. The data API receives this request and sends a request for the same to the blockchain node. The blockchain node returns the requested transaction information to the data API in response to the request, and the data API forwards the transaction information to the external application. The transaction information can include information related to a transaction identifier, operations (e.g., operation identifier, related operations, type, status, account, address, amount, coin change, coin action, other metadata, and the like), related transactions, other metadata (e.g., size, lock time, and the like), and the like.

Further, the external application can send a request in the standard format to retrieve balance information for an identified account and identified block (e.g., based on the transaction information discussed above). In an example, the request can include information related to a network identifier, account identifier, block identifier, and currencies. The data API receives this request and sends a request for the same to the blockchain node. The blockchain node returns the requested balance information to the data API in response to the request, and the data API forwards the balance information to the external application. The balance information can include information related to a block identifier, balance(s), other metadata (e.g., sequence number), and the like.

Moreover, the external application can send a request in the standard format to retrieve mempool transactions for an identified network. In an example, the request can include information related to a network identifier and/or other metadata. The data API receives this request and sends a request for the same to the blockchain node and/or synchronized database (e.g., block storage). The blockchain node returns the requested mempool transactions to the data API in response to the request, and the data API forwards the mempool transactions to the external application. The mempool transactions can include information related to transaction identifiers (e.g., hash), and the like.

As also illustrated, the external application can send a request in the standard format to retrieve mempool transaction information for an identified network. In an example, the request can include information related to a network identifier and/or a transaction identifier. The data API receives this request and sends a request for the same to the blockchain node. The blockchain node returns the requested mempool transaction information to the data API in response to the request, and the data API forwards the mempool transaction information to the external application. The mempool transaction information can include information related to a transaction identifier (e.g., hash), operations (e.g., operation identifier, related operations, type, status, account, amount, coin change, other metadata, and the like), related transactions, other metadata, and the like.

Figure 8B:
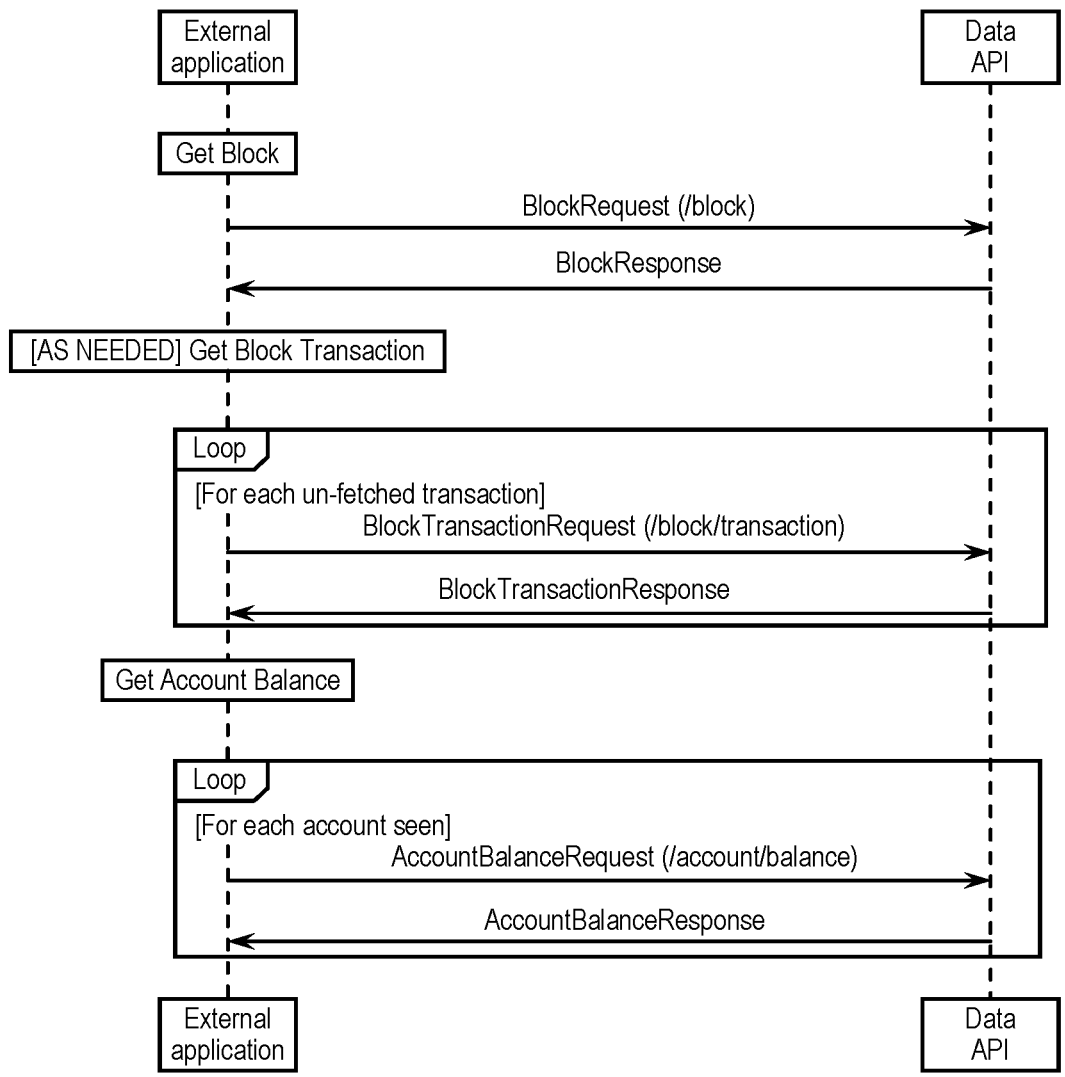
FIG. 8B is an illustrative example of requesting block and account information.

FIG. 8B is an illustrative example of requesting block and account information.

In some implementations, the data API enables the external application to retrieve the contents of any block, getting a particular transaction in a block, and fetching the balance of any account present in a block. As shown in FIG. 8B, the external application can: send a request for a block, send a request for transactions for the block, and retrieve an account balance (e.g., for each account). The data API can: send a response for the block request, send a response for the transactions request (e.g., for each transaction), and send a response for the account balance request (e.g., for each account).

In some variations, an account balance endpoint (e.g., UTXO chains) is provided by the data API that can involve an indexer (e.g., UTXO indexer, or the indexer 7110) that provides atomic balance lookups (e.g., the balance of an account can be retrieved based on the block index and block hash where it was valid in a single call).

Figure 8C:
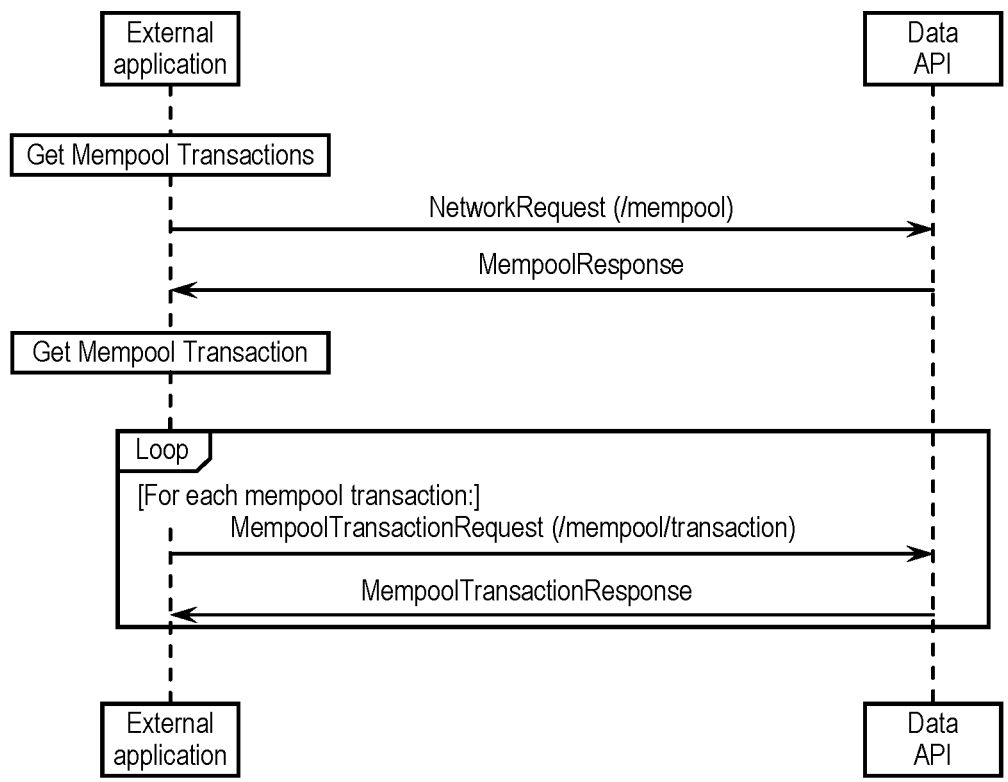
FIG. 8C is an illustrative example of requesting mempool information.

FIG. 8C is an illustrative example of requesting mempool information.

In the example of FIG. 8B, a data flow for fetching all mempool transactions and fetching particular mempool transactions (e.g., useful for integrators that want to monitor the status of their broadcasts and to inspect any incoming deposits before they are confirmed on-chain) is shown.

Figure 9A:
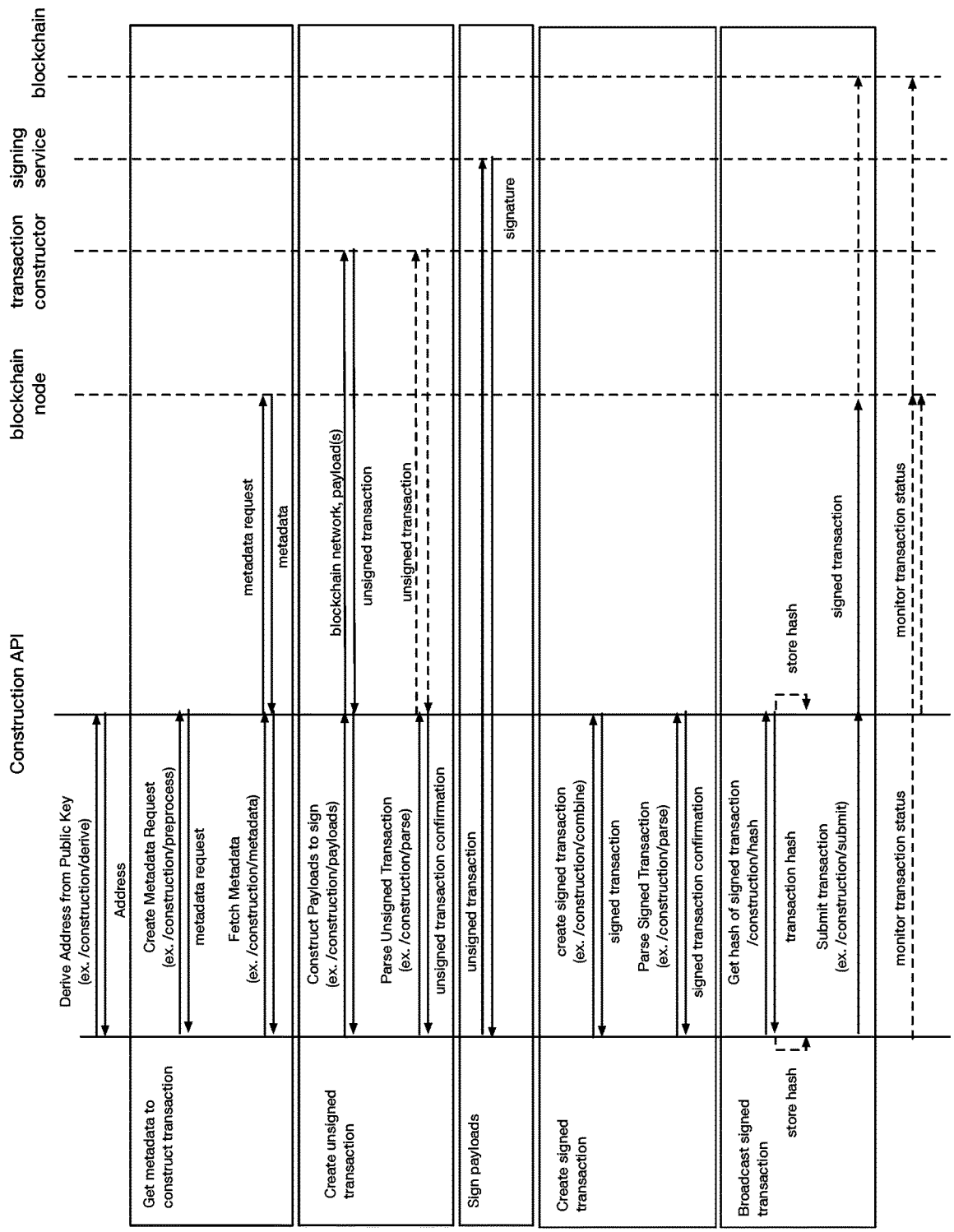
FIG. 9A is an illustrative example of transaction construction, signing, and transmission to the blockchain network for subsequent on-chain validation.

FIG. 9A is an illustrative example of transaction construction, signing, and transmission to the blockchain network for subsequent on-chain validation. Portions of the example of FIG. 9A have been discussed above in connection with the method 200 in FIG. 2.

In the example of FIG. 9A, the construction API (e.g., the construction API 144) provides functions to modify any blockchain's state in a standardized format. In some implementations, the construction API does not keep any state. For example, the construction API does not assume that it can persist data to help with transaction construction between calls where each invocation of a function in the construction API will be a fresh invocation in a new execution environment (e.g., all information needed in later calls must be confined to the responses).

In some variations, the construction API implementation runs in a completely offline environment (e.g., disconnected from the internet; off-chain but connected to the internet; etc.). Some blockchains require dynamic information to construct valid transactions (e.g., account nonce or recent block hash). Any metadata required for transaction construction can be retrieved by creating a request that must be made to a particular endpoint (e.g., /construction/metadata) in the data API. Consequently, this explicit connectivity boundary allows for comprehensive auditing of all communication that occurs during transaction construction.

Further, the construction API supports detached key generation & signing. In an implementation, the construction API exclusively supports detached key management (i.e. key generation and signing). In some variations, a construction API implementation provides a series of payloads to sign during construction instead of signing transactions directly with some provided key, and it is up to the user (e.g., the external application) of the construction API implementation to return a correctly formatted signature to the implementation (the format of each signature type is explicitly specified). These payloads can be signed using a detached signer owned by the user, the platform, or other system.

In this illustrative example, an external application (e.g., third party, client, caller, etc.) can send various request for querying various data in a standard format to an implementations of the construction API, which in turn communicates with a central platform (e.g., implementing node API server 111). As discussed before, the requests can include: the blockchain network, the API calls, and optionally the parameter values for the API calls (e.g., payload to be signed and broadcast; block identifier to be interrogated; etc.) as discussed before, among other types of information or data.

The external application sends one or more requests in a standard format to a given implementation of a construction API (e.g., the construction API 144). In some implementations, the construction API provides one or more network endpoints that are utilized to determine metadata for a transaction, create an unsigned transaction, create a signed transaction, and broadcast the signed transaction.

In some variations, the external application sends a request in the standard format to derive an address from a public key. The construction API receives this request and returns an account identifier associated with a public key.

In some variations, the external application sends a request in the standard format to create a metadata request for any metadata that is needed for transaction construction (e.g., account nonce). In an implementation, the construction API receives this request and returns a data object comprising information related to one or more options and/or the generated metadata request.

Next, the external application sends a request to retrieve metadata (e.g., based on the generated metadata request and/or data object discussed above), which is required to construct a transaction for a specific network, to the construction API. The construction API sends a request for the same to a blockchain node. The blockchain node returns metadata for the request, which can include a recent hash to use, an account sequence number, or even arbitrary chain state, among other types of information, to the construction API. The construction API then forwards the metadata to the external application.

To create an unsigned transaction in this example, the external application sends a request to generate an unsigned transaction and construct one or more payloads to sign. The request can include information related to the retrieved metadata discussed above and an array of operations. The construction API receives the request and sends a request (which may include information related to a blockchain network, payload(s)) for the same to a transaction constructor (e.g., the transaction constructor 150). The transaction constructor receives the request and returns information related to the unsigned transaction and/or requested payloads (e.g., an unsigned transaction blob and a collection of payloads that must be signed by particular account identifiers using a certain signature type). The construction API receives this information which is then returned to the external application.

To determine the intent of the generated transaction and validate the same, the external application can send a request to parse the generated transaction, which is received by the construction API. The construction API can parse the transaction, or forward a request for the same to the transaction constructor, which then validates the intent of the generated transaction, and returns a response to the construction API. In some implementations, response includes information indicating that the generated transaction has been validated.

After the generated transaction has been validated, to sign one or more of the payloads, the external application sends a request to a signing service (e.g., the signing service 152). The signing service can generate signatures based on the payloads and/or sign the payloads and return the signed payloads to the external application. Next, the external application creates a signed transaction using the signed payloads from the signing service as discussed below.

Alternatively or conjunctively, to sign one or more of the payloads, the external application signs the payloads using a detached signer implemented or provided by the external application. The external application then sends a request to generate the signed transaction with the set of signatures and unsigned transaction to the construction API. The construction API creates a network-specific signed transaction from the unsigned transaction and the set of provided signatures. The construction API then returns the signed transaction to the external application.

To validate the signed transaction, the external application sends a request to the construction API to parse the signed transaction. The construction API (and/or blockchain node or validation service) receives the request, parses the signed transaction, and returns a response including an indication that the signed transaction has been validated to the external application.

After validating the signed transaction, the external application broadcasts the signed transaction to a given blockchain network. In an implementation, the external application sends a request to determine the hash of the signed transaction to the construction API (e.g., to enable the external application to track the on-chain transaction state). The construction API receives the request and returns the hash to the external application. Next, the external application sends a request to submit the signed transaction to the blockchain network to the blockchain node. The blockchain node receives the request, and subsequently broadcasts the signed transaction to the blockchain (e.g., the blockchain network 180).

Figure 9B:
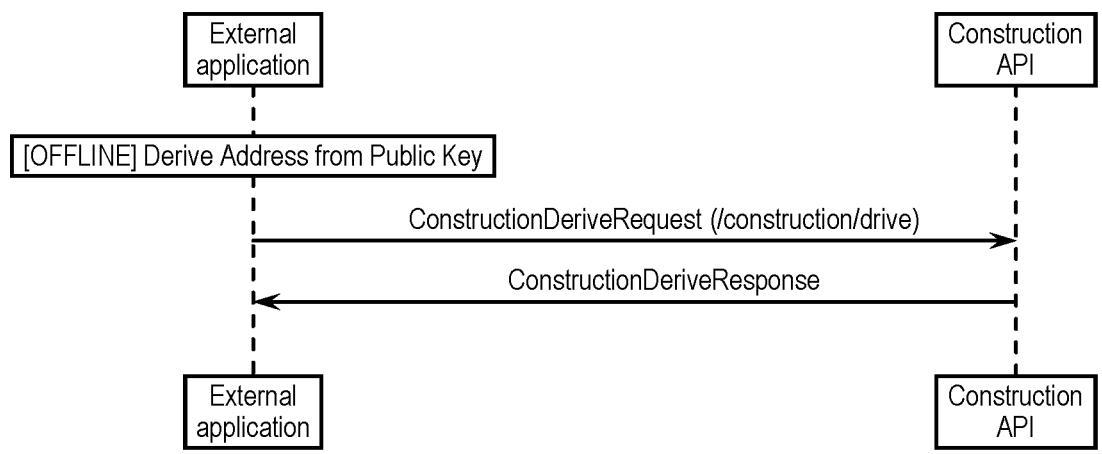
FIG. 9B is an illustrative example of deriving an address from a public key.

FIG. 9B is an illustrative example of deriving an address from a public key.

While the data API provides the ability to read data from a blockchain in a standard format, the construction API enables developers or external application(s) to write to a blockchain (e.g., construct transactions) in a standard format. To meet strict security standards, in some implementations, the construction API is stateless, operates entirely offline, and supports detached key generation and signing. The external application can derive an address from a public key (e.g., on blockchains that do not require on-chain origination) using the construction API as shown in FIG. 9B, which is similarly discussed in portions of FIG. 9A above.

Figure 9C:
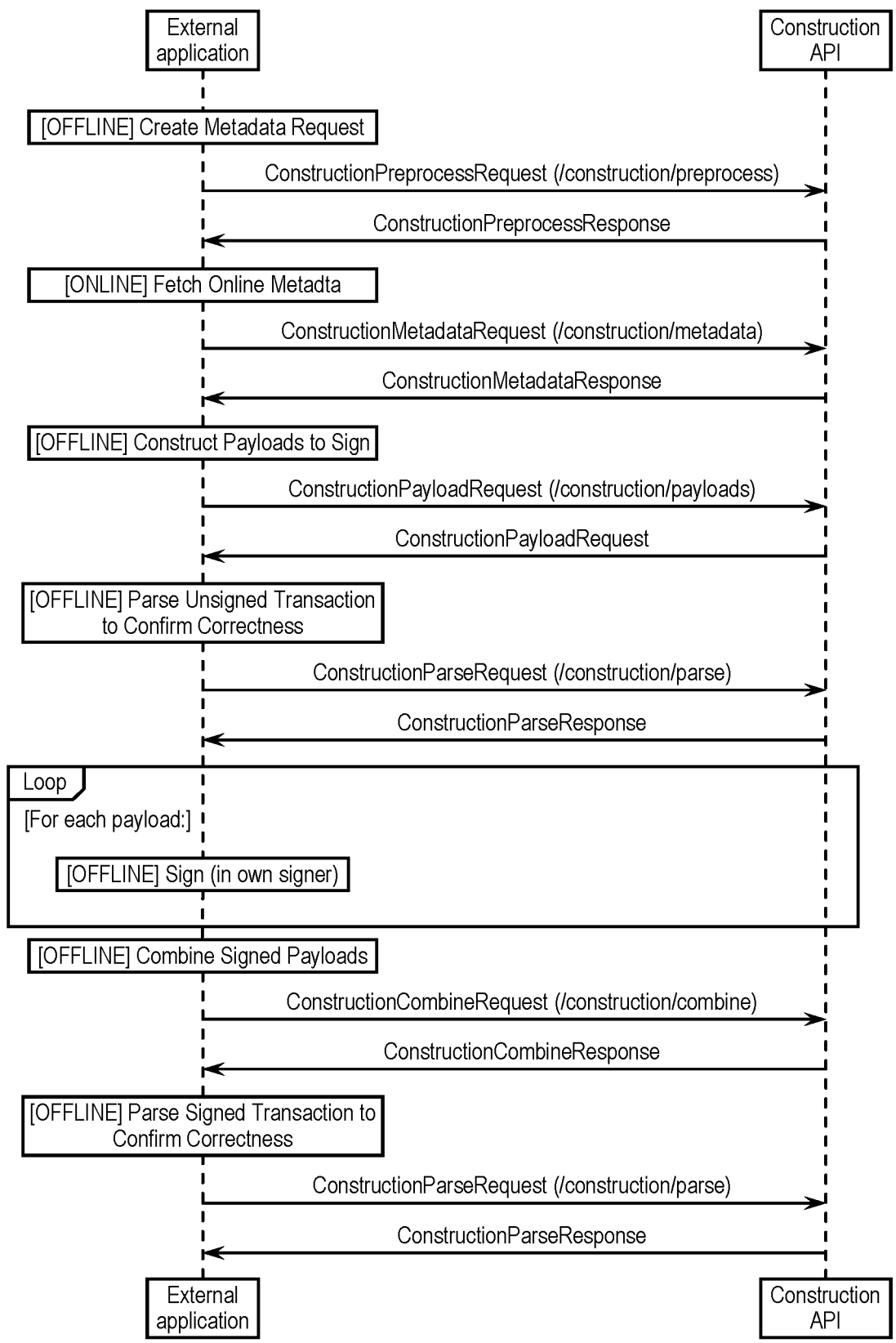
FIG. 9C is an illustrative example of transaction construction and signing.

FIG. 9C is an illustrative example of transaction construction and signing.

When constructing a transaction generically, it is often not possible to fully specify the result or what may appear on-chain (e.g., constructing a transaction that attempts to use a "flash loan"). The collection of operations that can be specified in the transaction is referred to as an "intent" (which is usually a subset of all operations in the on-chain transaction). By way of example, constructing a transaction with the construction API entails creating an "intent", gathering the metadata required to create a transaction with the "intent", signing payloads from accounts responsible for the "intent", and broadcasting the transaction created. Before attempting to sign or broadcast a transaction, the external application confirms that the transaction that was constructed has the same "intent" that was originally provided when imitating the construction flow.

As shown in FIG. 9C, an entire construction flow between the external application and the construction API is illustrated in an example. In this example, the external application can send one or more requests to: create a metadata request, fetch online metadata, construct payloads to sign, parse an unsigned transaction to confirm correctness (e.g., validate), combine signed payloads, and parse a signed transaction to confirm correction (e.g., validate). As also shown, for each payload, the external application can sign a particular payload using its own signer. The construction API can send: a response for creating the metadata request, a response for the metadata request, a response for the request to construct payloads, a response for parsing the unsigned transaction, a response to the request to combine payloads, and a response for parsing the signed transaction.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the subject technology without departing from the scope of this subject technology defined in the following claims.

Different subsystems and/or modules discussed above can be operated and controlled by the same or different entities. In the latter variants, different subsystems can communicate via: APIs (e.g., using API requests and responses, API keys, and the like), requests, and/or other communication channels.

When information or data is stored or transferred, the information or data can be: cleartext, hashed, in an encrypted format (e.g., encrypted with a key associated with the components and/or modules discussed above, and the like), signed (e.g., with a verification key associated with the components and/or modules discussed above, and the like), and/or otherwise transmitted. The sending systems can be authenticated, authorized, or otherwise verified by the receiving systems before establishing a communication channel (e.g., using credentials, tokens, passwords, or other authentication or authorization mechanisms); alternatively, the sending systems can be unauthorized or unauthenticated.

Alternative embodiments implement the above methods and/or processing modules in non-transitory computer-readable media, storing computer-readable instructions, that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, and the like), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the subject technology without departing from the scope of this subject technology defined in the following claims.

I claim:

1. A method comprising:
    receiving, by a server system, from a remote application remote from the server system via the Internet, a standardized blockchain request identifying a blockchain network, and requesting, by the server system, metadata related to a block, that is determined based on the standardized blockchain request and is a respective block on the blockchain network, from a blockchain node in connection with receiving the standardized blockchain request from the remote application;
    generating, by the server system, blockchain-specific payload data for the blockchain network based on the metadata related to the block;
    sending, by the server system, the blockchain-specific payload data to the remote application via the Internet, and receiving, by the server system, one or more signatures in connection with the sending of the blockchain-specific payload data to the remote application, the one or more signatures being derived from signing the blockchain-specific payload data using one or more keys;
    constructing, by the server system, a blockchain-specific call for the blockchain network, the blockchain-specific call comprising signed payload data generated based on the blockchain-specific payload data and the one or more signatures received in connection with the sending of the blockchain-specific payload data to the remote application;
    interacting with the blockchain network using the blockchain-specific call; and
    returning a response to the blockchain-specific call in a standardized format.

2. The method of claim 1, wherein the remote application remote from the server system comprises a first application at a client device.

3. The method of claim 1, wherein the remote application remote from the server system comprises a wallet application.

4. The method of claim 1, wherein receiving the one or more signatures comprises receiving the one or more signatures from the remote application in connection with the sending of the blockchain-specific payload data to the remote application.

5. The method of claim 1, further comprising:
    obtaining, by the server system, via the blockchain network, metadata related to a block on the blockchain network for generating the blockchain-specific payload data, the block being determined based on the standardized blockchain request,
    wherein generating the blockchain-specific payload data comprises generating the blockchain-specific payload data based on the metadata related to the block.

6. The method of claim 5, wherein obtaining the metadata comprises obtaining a block hash related to the block,
    wherein generating the blockchain-specific payload data comprises generating the blockchain-specific payload data based on the block hash related to the block.

7. The method of claim 1, wherein the blockchain-specific payload data comprises multiple payloads,
    wherein receiving the one or more signatures comprises receiving multiple signatures in connection with the sending of the blockchain-specific payload data to the remote application, and
    wherein constructing the blockchain-specific call comprises constructing the blockchain-specific call comprising multiple signed payloads generated based on the multiple payloads and the multiple signatures received in connection with the sending of the blockchain-specific payload data to the remote application.

8. One or more non-transitory computer-readable media storing instructions that, when executed by one or more processors, cause operations comprising:
    receiving, from a remote application remote from a server system via the Internet, a standardized blockchain request identifying a blockchain network, and requesting metadata related to a block from a blockchain node in connection with receiving the standardized blockchain request from the remote application, wherein the block is determined based on the standardized blockchain request and is a respective block on the blockchain network;
    generating a blockchain-specific payload data for the blockchain network based on the metadata related to the block;
    sending the blockchain-specific payload data to the remote application via the Internet, and receiving, by the server system, one or more signatures in connection with the sending of the blockchain-specific payload data to the remote application, the one or more signatures being derived from signing the blockchain-specific payload data using one or more keys;
    constructing a blockchain-specific call for the blockchain network, the blockchain-specific call comprising signed payload data generated based on the blockchain-specific payload data and the one or more signatures received in connection with the sending of the blockchain-specific payload data to the remote application;
    interacting with the blockchain network using the blockchain-specific call; and
    returning a response to the blockchain-specific call in a standardized format.

9. The one or more non-transitory computer-readable media of claim 8, wherein the remote application remote from the server system comprises a first application at a client device.

10. The one or more non-transitory computer-readable media of claim 8, wherein the remote application remote from the server system comprises a wallet application.

11. The one or more non-transitory computer-readable media of claim 8, wherein receiving the one or more signatures comprises receiving the one or more signatures from the remote application in connection with the sending of the blockchain-specific payload data to the remote application.

12. The one or more non-transitory computer-readable media of claim 8, the operations further comprising:
    obtaining, by the server system, metadata related to a block on the blockchain network for generating the blockchain-specific payload data, the block being determined based on the standardized blockchain request,
    wherein generating the blockchain-specific payload data comprises generating the blockchain-specific payload data based on the metadata related to the block.

13. The one or more non-transitory computer-readable media of claim 12, wherein obtaining the metadata comprises obtaining a block hash related to the block,
- wherein generating the blockchain-specific payload data comprises generating the blockchain-specific payload data based on the block hash related to the block.

14. The one or more non-transitory computer-readable media of claim 8, wherein the blockchain-specific payload data comprises multiple payloads,
- wherein receiving the one or more signatures comprises receiving multiple signatures in connection with the sending of the blockchain-specific payload data to the remote application, and
- wherein constructing the blockchain-specific call comprises constructing the blockchain-specific call comprising multiple signed payloads generated based on the multiple payloads and the multiple signatures received in connection with the sending of the blockchain-specific payload data to the remote application.

15. A server system comprising:
- one or more processors programmed with computer program instructions that, when executed by the one or more processors, cause operations comprising:
  - receiving, from a remote application remote from the server system via the Internet, a standardized blockchain request identifying a blockchain network, and requesting metadata related to a block from a blockchain node in connection with receiving the standardized blockchain request from the remote application, wherein the block is determined based on the standardized blockchain request and is a respective block on the blockchain network;
  - generating blockchain-specific payload data for the blockchain network based on the metadata related to the block;
  - sending the blockchain-specific payload data to the remote application via the Internet, and receiving, by the server system, one or more signatures in response to the sending of the blockchain-specific payload data to the remote application, the one or more signatures being derived from signing the blockchain-specific payload data using one or more keys;
  - constructing a blockchain-specific call for the blockchain network, the blockchain-specific call comprising signed payload data generated based on the blockchain-specific payload data and the one or more signatures received in response to the sending of the blockchain-specific payload data to the remote application;
  - interacting with the blockchain network using the blockchain-specific call; and
  - returning a response to the blockchain-specific call in a standardized format.

16. The system of claim 15, wherein the remote application remote from the server system comprises a first application at a client device.

17. The system of claim 15, wherein the remote application remote from the server system comprises a wallet application.

18. The system of claim 15, wherein receiving the one or more signatures comprises receiving the one or more signatures from the remote application in in response to the sending of the blockchain-specific payload data to the remote application.

19. The system of claim 15, the operations further comprising:
- obtaining, by the server system, block hash related to a block on the blockchain network for generating the blockchain-specific payload data, the block being determined based on the standardized blockchain request,
- wherein generating the blockchain-specific payload data comprises generating the blockchain-specific payload data based on the block hash related to the block.

20. The system of claim 15, wherein the blockchain-specific payload data comprises multiple payloads,
- wherein receiving the one or more signatures comprises receiving multiple signatures in connection with the sending of the blockchain-specific payload data to the remote application, and
- wherein constructing the blockchain-specific call comprises constructing the blockchain-specific call comprising multiple signed payloads generated based on the multiple payloads and the multiple signatures received in connection with the sending of the blockchain-specific payload data to the remote application.

\* \* \* \* \*